US012761731B2

(12) United States Patent
Bennett et al.

(10) Patent No.: US 12,761,731 B2
(45) Date of Patent: Oct. 13, 2026

(54) CONTEXTUALIZED DECODING FOR BRAIN COMPUTER INTERFACE SYSTEMS

(71) Applicant: Synchron Australia Pty Limited, St Kilda East (AU)

(72) Inventors: James Bennett, Dover, DE (US); Evan Schnell, Dover, DE (US); Peter Eli Yoo, Dover, DE (US)

(73) Assignee: Synchron Australia Pty Limited, St Kilda East (AU)

( * ) Notice: Subject to any disclaimer, the term of this patent is extended or adjusted under 35 U.S.C. 154(b) by 0 days.

(21) Appl. No.: 18/930,582

(22) Filed: Oct. 29, 2024

(65) Prior Publication Data

US 2025/0138635 A1 May 1, 2025

Related U.S. Application Data

(60) Provisional application No. 63/594,022, filed on Oct. 29, 2023.

(51) Int. Cl.
*G06F 3/01* (2006.01)

(52) U.S. Cl.
CPC .................................... *G06F 3/015* (2013.01)

(58) Field of Classification Search
CPC ........................................................ G06F 3/015
See application file for complete search history.

(56) References Cited

U.S. PATENT DOCUMENTS

| | | | | |
|---|---|---|---|---|
| 5,178,161 | A * | 1/1993 | Kovacs | A61N 1/3605 607/115 |
| 6,175,767 | B1 * | 1/2001 | Doyle, Sr. | A61N 1/36036 607/57 |
| 9,480,582 | B2 * | 11/2016 | Lundborg | A61F 2/70 |
| 10,123,133 | B2 * | 11/2018 | Pontoppidan | H04R 25/02 |
| 10,264,990 | B2 * | 4/2019 | Pasley | A61B 5/6814 |
| 10,441,172 | B2 * | 10/2019 | Tanaka | A61B 5/0042 |
| 10,485,968 | B2 * | 11/2019 | Opie | A61F 2/92 |
| 10,512,555 | B2 * | 12/2019 | John | A61B 5/293 |
| 10,575,783 | B2 * | 3/2020 | Oxley | A61B 5/4064 |
| 10,729,530 | B2 * | 8/2020 | Opie | A61B 5/4052 |
| 10,925,509 | B2 * | 2/2021 | Nestor | G06F 18/2431 |
| 11,071,465 | B2 * | 7/2021 | Angle | A61B 5/24 |
| 11,395,620 | B1 * | 7/2022 | Moshe | A61N 1/36135 |
| 11,467,665 | B2 * | 10/2022 | Gribetz | A61N 1/36082 |
| 11,662,816 | B2 * | 5/2023 | Furman | A61B 5/117 345/156 |
| 12,147,603 | B2 * | 11/2024 | Furman | A61B 5/117 |
| 2003/0093129 | A1 * | 5/2003 | Nicolelis | G06F 3/016 607/45 |
| 2004/0172098 | A1 * | 9/2004 | Greenberg | A61N 1/36046 607/54 |
| 2005/0283202 | A1 * | 12/2005 | Gellman | A61N 1/3787 607/48 |

(Continued)

FOREIGN PATENT DOCUMENTS

| | | |
|---|---|---|
| WO | WO-2020242888 A1 * | 12/2020 |
| WO | WO 2025/096439 | 5/2025 |

*Primary Examiner* — William Lu
(74) *Attorney, Agent, or Firm* — Holland & Hart LLP

(57) ABSTRACT

Decoders for use in brain-computer interfaces (BCI) using contextual data to contextually decode a neural signal from an individual using the BCI and into some actionable command that allows the BCI to interact with a device coupled to the BCI.

26 Claims, 17 Drawing Sheets

(56) References Cited

U.S. PATENT DOCUMENTS

2008/0242950 A1* 10/2008 Jung .................... G16H 40/67 600/300
2008/0319276 A1* 12/2008 Jung .................... G16H 50/20 600/300
2009/0125082 A1* 5/2009 Schleich ............ A61N 1/36038 607/57
2010/0026798 A1* 2/2010 Schmid ................ A61B 5/1113 348/61
2011/0144471 A1* 6/2011 Hsu ...................... B82Y 15/00 29/846
2011/0227586 A1* 9/2011 Lovetri ................ A61B 5/0507 324/637
2012/0078820 A1* 3/2012 Azam .............. H04N 21/42201 706/46
2012/0310105 A1* 12/2012 Feingold ................ A61B 5/374 600/544
2013/0060125 A1* 3/2013 Zeman .................. A61B 5/374 600/409
2013/0131535 A1* 5/2013 Sun ...................... A61B 5/378 600/544
2013/0184558 A1* 7/2013 Gallant ................ A61B 5/0042 600/409
2014/0214120 A1* 7/2014 Simon .................. A61N 1/3787 607/46
2014/0288667 A1* 9/2014 Oxley ................ A61N 1/36067 607/45
2015/0119689 A1* 4/2015 Pascual-Leone ...... A61N 2/006 600/407
2015/0126892 A1* 5/2015 Kim ...................... A61B 5/372 600/545
2015/0142082 A1* 5/2015 Simon ................ A61N 1/36132 607/61
2015/0248470 A1* 9/2015 Coleman ................ G16H 10/20 707/740
2016/0073887 A1* 3/2016 Lee ...................... H01B 11/22 600/377
2016/0109851 A1* 4/2016 Tsang .................... G06F 3/011 359/9
2016/0239084 A1* 8/2016 Connor ................ A61B 5/6803
2016/0282939 A1* 9/2016 Sørensen ................ G06F 3/015
2017/0087367 A1* 3/2017 Weisend .............. A61B 5/4064
2017/0340881 A1* 11/2017 Connolly ............. A61N 1/3606
2018/0021579 A1* 1/2018 Kahana .............. A61N 1/36082 607/45
2018/0184974 A1* 7/2018 Cimenser ................. A61B 5/38
2018/0200389 A1* 7/2018 Wong .................... C09B 23/086
2018/0210549 A1* 7/2018 Segal ...................... G06F 3/015
2018/0245097 A1* 8/2018 Vogel ................... C12Q 1/6897
2018/0304095 A1* 10/2018 Register ............... A61N 5/0622
2019/0082990 A1* 3/2019 Poltorak .............. A61B 5/7267
2019/0227490 A1* 7/2019 Waller ................... G02B 21/06
2019/0247662 A1* 8/2019 Poltroak ............ A61N 1/36092
2019/0336060 A1* 11/2019 Shen .................. G01B 9/02091
2019/0336748 A1* 11/2019 Oxley .................. A61N 1/0534
2019/0357797 A1* 11/2019 Nestor ................. G06V 10/774
2020/0016396 A1* 1/2020 Yoo ........................ A61B 6/501
2020/0057498 A1* 2/2020 Artemiadis ............ G06N 20/00
2020/0078195 A1* 3/2020 John ......................... A61F 2/72
2020/0105398 A1* 4/2020 Chen ....................... G06F 3/015
2020/0196932 A1* 6/2020 Johnson ............... A61B 5/7455
2020/0282223 A1* 9/2020 Schwemmer .......... G06N 3/045
2020/0363869 A1* 11/2020 Yoo ...................... A61B 5/7267
2021/0138249 A1* 5/2021 Howard ............. A61N 1/36082
2021/0196980 A1* 7/2021 Howard ............. A61N 1/36031
2021/0223864 A1* 7/2021 Forsland ................. G06F 3/016
2021/0240265 A1* 8/2021 Pilly .................... A61B 5/0095
2021/0293714 A1* 9/2021 Matoba .................. G02B 21/16
2021/0361950 A1* 11/2021 Opie ...................... A61B 5/293
2021/0365117 A1* 11/2021 Yoo ......................... G06F 3/015
2021/0373665 A1 12/2021 Yoo
2022/0171459 A1* 6/2022 Segal .................... G06F 16/436
2022/0417678 A1* 12/2022 Moshe ................... A61B 5/388
2023/0026513 A1 1/2023 Kouider et al.
2023/0077519 A1* 3/2023 Cheung ................. A61B 5/1118 600/27
2023/0259208 A1* 8/2023 Furman .................. A61B 5/117 345/156
2024/0168553 A1* 5/2024 Borkowski ............. G06F 3/015

* cited by examiner

CONTEXTUALIZED DECODING FOR BRAIN COMPUTER INTERFACE SYSTEMS

CROSS-REFERENCE TO RELATED APPLICATIONS

This application is a provisional of U.S. Application No. 63/594,022 filed Oct. 29, 2023, the entirety of which is incorporated by reference.

BACKGROUND OF THE INVENTION

Decoders for use in brain-computer interfaces (BCI) detect a recorded or detected neural signal from an individual using the BCI and decode the neural signal into some actionable command that allows the BCI to interact with a device coupled to the BCI. Some decoders are more suitable in some circumstances than others. BCI decoders are typically used to change the state of a computer application. Some state transitions have higher potential functional and that allows social consequences than others (e.g., pressing send on an email compared to typing a character). It may be appropriate to change decoders based on their accuracy/speed and the current context of the application state. However, it is unwieldy and undermines autonomy for the individual to have to switch decoders manually. There remains a need to improve BCI interfaces and alter the decoder portion of the system to increase ease of use and benefit to the individual.

SUMMARY OF THE INVENTION

The present disclosure includes method of decoding an electronic signal that is generated by a neural interface device configured to detect a brain activity of an individual and using contextual information to determine how to decode the signal such that decoding of the signal is affected by factors related to the individual.

In one variation, the method includes transmitting the electronic signal to a computer processor; generating a contextual data by actively monitoring the individual; processing the electronic signal using the computer processor to produce an output signal, where the computer processor is configured to selectively apply at least one algorithm from a plurality of algorithms for decoding the electronic signal, wherein selection of the at least one algorithm is at least partially dependent on the contextual data; and electronically transmitting the output signal to one or more external electronic devices such that the individual is able to interact with the one or more external electronic devices using the brain activity.

In another variation, the methods described herein include facilitating interaction between an individual and one or more electronic devices using contextual information associated with the individual, when the individual uses a neural interface device that is configured to generate an electronic signal that is decoded from a brain activity of the individual, the method including: transmitting the electronic signal to a computer processor; generating a contextual input data through monitoring of contextual information associated with the individual; processing the electronic signal using the computer processor to selectively apply at least one algorithm from a plurality of algorithms for decoding the electronic signal to produce an output signal, wherein selection of the at least one algorithm is at least partially dependent on the contextual input data; and electronically transmitting the output signal to the one or more electronic devices such that the individual is able to interact with the one or more electronic devices using brain activity.

Generating the contextual data can occur by monitoring the individual prior to or during interaction between the individual and the one or more external electronic devices. Monitoring of the individual can occur actively by observing real-time conditions associated with the individual as the individual interacts with the BCI and various electronic devices coupled thereto. Alternatively, or in combination, monitoring of the individual can occur by monitoring a history of the conditions associated with the individual as the individual interacts with the BCI and various electronic devices coupled thereto. The contextual data can include information regarding an electronic device of the plurality of additional electronic devices that the individual is actively engaging and/or information regarding which of the plurality of additional electronic devices are actively coupled to the computer processor.

In another variation, prior to processing the electronic signal, the computer processor confirms that the electronic signal is representative of the brain activity that is intentionally generated by the individual.

As noted herein, generating the contextual data by monitoring the individual includes obtaining data regarding environmental factors associated with the individual, health information associated with the individual, how the individual is using the one or more external electronic devices, and whether the individual is attempting to move a cursor on the one or more external electronic devices, regarding whether the individual is attempting to electronically enter text in the one or more external electronic devices.

The results of the contextual data can cause select an algorithm that reduces the latency of the output signal, to increase latency of the output signal, to increase an accuracy of the output signal, and/or to increase or decrease a speed of producing the output signal. Increasing latency will result in slowing of the interaction between the individual and the BCI to control a device. Decreasing latency can increase the speed of interaction. Increasing and/or decreasing accuracy of the output can be adjusted if the user is attempting to achieve increased control of the interface (e.g., typing) or requires decreased control (e.g., scrolling through text).

The contextual data can also selects an algorithm to produce the output signal as a continuous output signal (e.g., if the user is attempting to move a cursor across a screen) or an algorithm to produce the output signal as a discrete output signal (e.g., selecting a button or link).

Variations of the present disclosure include a method wherein the computer processor is located within a signal control unit, including a housing structure that is physically separate from the neural interface device and is configured to be portable, and where electronically transmitting the output signal to one or more external electronic devices includes electronically transmitting the output signal from the signal control unit.

Generating the contextual data by monitoring the individual includes obtaining data regarding which of the one or more external electronic devices is operatively connected to the signal control unit, and/or monitoring the individual includes obtaining data regarding a number of electronic communication modalities operatively connected to the signal control unit. The monitoring can occur actively by monitoring what the individual is doing in the moment, and/or the monitoring can include information regarding the individual and/or components of the system that the individual is able to interact with through use of the BCI system. Generating the contextual data can also include actively monitoring the individual obtaining data regarding an activity state (sleep, active, low energy, etc.) of the signal control unit or by monitoring a previous output signal transmitted to the one or more external electronic devices by the individual.

BRIEF DESCRIPTION OF THE FIGURES

The drawings shown and described are exemplary embodiments and non-limiting. Like reference numerals indicate identical or functionally equivalent features throughout.

DETAILED DESCRIPTION

Figure 1A:
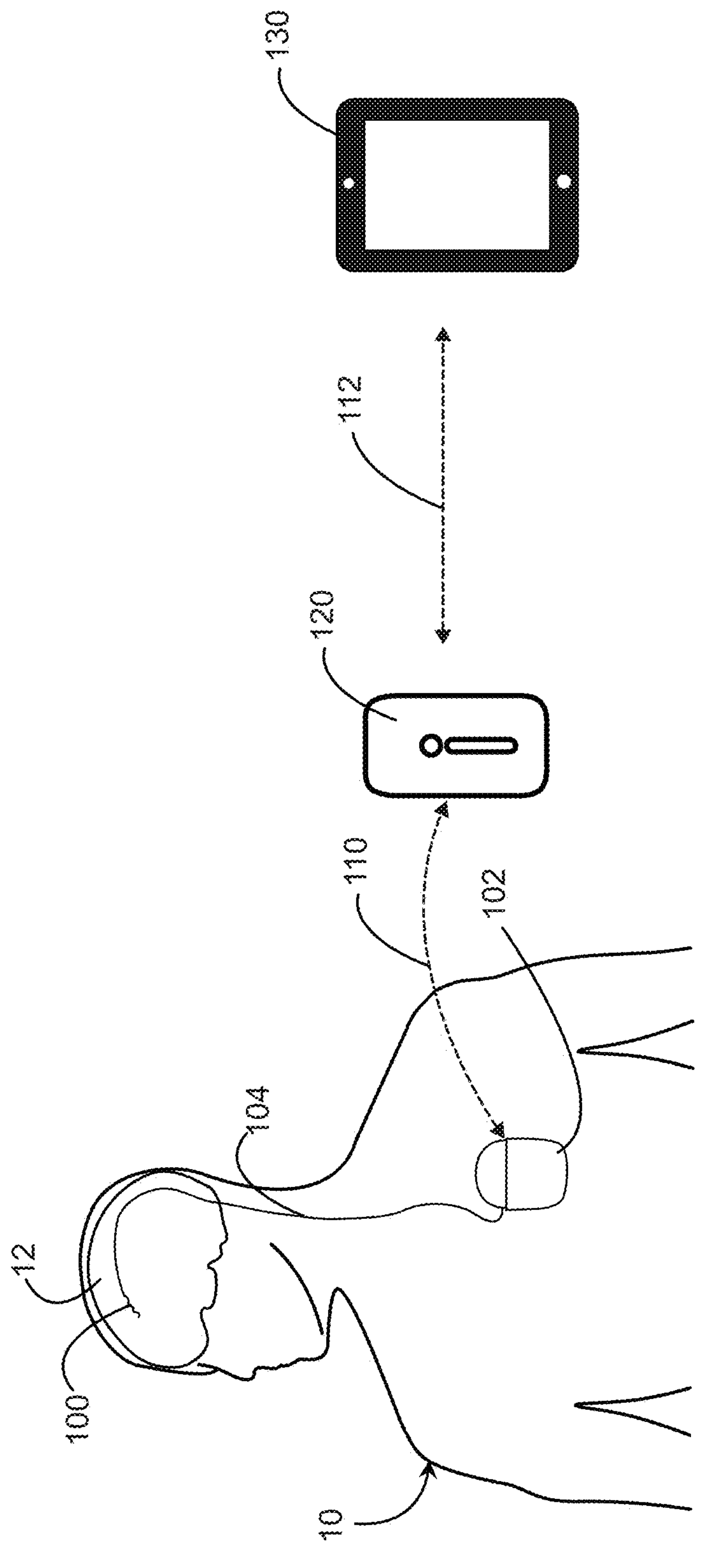
FIG. 1A is a representative illustration of a brain computer interface comprising an implant/electrode device positioned within a brain of an individual.

FIG. 1A is a representative illustration of a brain computer interface comprising an implant/electrode device 100 positioned within a brain 12 of an individual. The implant 100 can be coupled to a receiver and transmitter unit 102, where the receiver and transmitter unit produces an electronic neural signal corresponding to brain signals from the brain of the individual detected by the implant 100. Typically, the implant 100 is coupled to the receiver and transmitter unit 102 via one or more leads 104. However, this communication can occur wirelessly. Moreover, the systems described herein can be used with various other implantable and non-implantable external devices configured to detect brain activity. In addition, the receiver and transmitter unit 102 can comprise an implantable housing where charging is performed through a capacitive or similar configuration from an external charging unit. Alternate variations include a receiver and transmitter unit 102 that is external to the individual 10.

FIG. 1A also shows the receiver and transmitter unit 102 having an ability to communicate with a signal control unit 120 that receives transmissions from the receiver and transmitter unit 102 and is configured to perform signal processing on the electronic neural signal to perform any number of functions for interaction with a host device 130 or a number of host devices. A host device can comprise any electronic device such as a computer or tablet, including dedicated and may also include non-dedicated (proprietary and/or non-proprietary) applications. The host device can support secure and proprietary communication with the signal control unit 120 and can provide a user interface for the individual BCI user. In some variations, individuals use the host device 130 to control a wide variety of applications. In another variation, the receiver and transmitter function 102 and the signal control function 120 can be housed in the same hardware, implanted in the individual.

This signal processing can include filtering, classifying, decoding, and transmitting the data received from the receiver and transmitter unit. In one variation, the inventive system simply comprises a signal control unit 120 and one or more external host devices 130, in which case the signal control unit 120 operates with a variety of systems. One benefit of using a dedicated signal control unit 120 is to provide a signal control unit 120 that allows for a power efficient low latency device for interaction with one or more electronic devices. In addition, the majority of the signal processing and data storage can occur in the signal control unit 120. The signal control unit 120 can be dedicated to signal processing and decision-making with custom applications to guide user interactions. In additional variations, the signal control unit 120 is configured to access a cloud-network 150 for computing and storage resources or for analytics. Offsetting such requirements from the implantable components allows for the minimization of the weight and size of the transmitter unit 120 and reduces the heat generated by the transmitter unit 102 during operation.

In addition, moving all or most of the computing power to the signal control unit 120 allows any software updates to take place outside of the BCI user's body. In addition, this configuration allows the receiver and transmitter unit 102 to operate with lower power requirements to reduce the frequency of recharging. In alternate variations, the processing, storage, and communication functions can be divided between the receiver and transmitter unit 102, the signal control unit 120, and/or any external devices 130.

Generally, BCI system (the implant 100 and receiver and transmitter unit 102) captures motor intention from the brain (e.g., the motor cortex) and produces one or more electrical signals corresponding to the motor intention. Electrical signals can be captured from brain activity in regions other than the motor cortex. The signal control unit 120 decodes the electrical signals for utilization with a host device 130 for control of software applications (typically on the host device 130). In some cases, the host device 130 can be used to control additional digital devices (such as a computer, wheelchair, home automation systems, or other devices) that aid the individual 10 using the BCI.

Figure 1B:
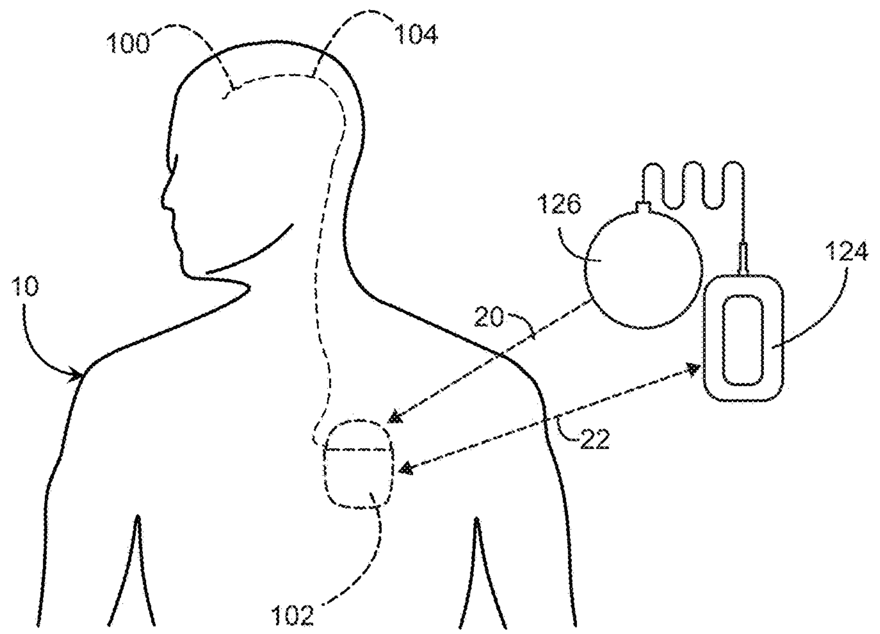
FIG. 1B shows a remote power supply that can be used to wirelessly charge and/or communicate with an implantable receiver and transmitter unit.

Variations of the systems and methods described herein include a benefit of increasing longevity of the implanted components (e.g., 100, 104, 102) of the system to avoid repeated surgeries to replace implanted components. Accordingly, variations of the system and methods allow for a receiver and transmitter unit 102 that can be remotely and/or wirelessly recharged (e.g., capacitively) using an external power supply, as represented in FIG. 1B. Alternative variations can include a receiver and transmitter unit 102 that allows for a physical connection to an external power supply.

In one example, the system is designed for increased longevity as well as to provide increased mobility and autonomy for the BCI user 10. Such systems and methods can employ an architecture that distributes processing and data storage capabilities across non-implanted components of the system, with the implanted receiver and transmitter unit 102 responsible for obtaining and transmitting a signal indicative of the intent of the user. For example, the receiver and transmitter unit 102 can communicate with the electrode 100 such that when the electrode detects a brain signal from a brain of the BCI user 10, the receiver and transmitter unit is configured to transmit an electronic signal representative of the brain signal.

Figure 1C:
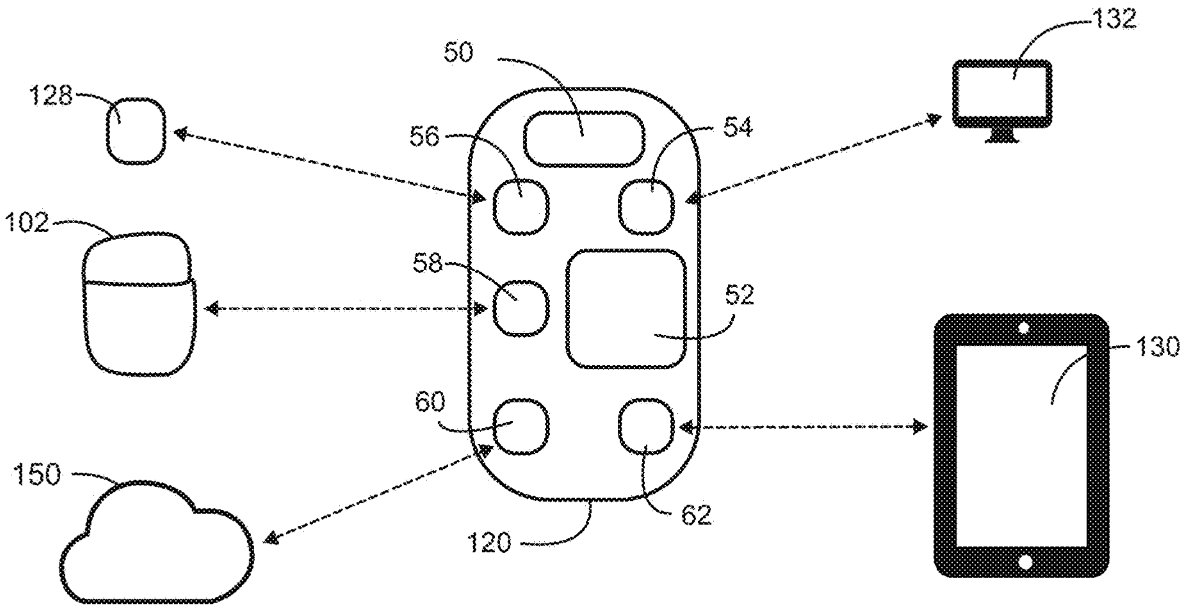
FIG. 1C illustrates a variation of a signal control unit that houses a power supply, processor, and circuity to enable wireless and/or wired electronic communication.

FIG. 1C illustrates a variation of a signal control unit 120 that houses a power supply 50, processor 52, and circuity 54-62 to enable wireless and/or wired electronic communication. The power supply 50 can comprise batteries or an external power source. The processor 52 is configured to apply one or more algorithms to decode the electronic signal from the transmission component. The signal control unit 120 can also be configured to produce an output signal upon determining that the electronic signal is representative of an intentional neural brain signal generated by the individual. Accordingly, the signal control unit 120 can house any number of communications circuitry or modules 54, 56, 58, 60, and 62 that can be used to electronically communicate with one or more external devices as discussed below. The modules can provide the signal control unit 120 with wireless or wired communication capabilities. Examples of wireless communication include but are not limited to, short-range wireless (e.g., blue tooth or blue tooth low energy), ultra-high frequency (such as low power device 433 MHz), as well as the ability to communicate via an HTTP/HTTPS using a WIFI or other network connection. In the variation illustrated in FIG. 1C, the signal control unit 120 can include one or more blue tooth low energy (BLE) modules to simultaneously or sequentially communicate with the receiver and transmitter unit 120 as well as any number of external devices 130, 132. The signal control unit 120 can also include different modules to simultaneously communicate with an alert device 128. Although not shown, the signal control unit 120 can include one or more speakers or alarms to play a tone, series of tones, pre-recorded message, or other audible message/sound. In an additional variation, one or more modules can comprise sensors to provide environmental and/or physiological information regarding the individual. Examples of environmental information can comprise the movement of the individual (using an accelerometer or GPS), ambient temperature, noise, etc. Examples of physiological data of the user can include heart rate, fatigue, caffeination, temperature, blood pressure, etc.)

In one variation of the system, the system is configured such that the signal control unit 120 is configured to interact with the receiver and transmitter unit 102 using a specific communication mode to limit the distribution of data from the receiver and transmitter unit 102. Such a specific communication mode can be encrypted, secured, and/or otherwise proprietary. This prevents transmission of data from the receiver and transmitter unit 102 to unauthorized devices. In some variations of the system, a host device is configured to receive data using this specific communication mode from the signal control unit 120. Therefore, one distinction between a host device 130 and other external devices 132 is that the external devices receive data using standard communication modes. In one variation of the system, the specific communication mode can comprise a proprietary and/or encrypted BLE, while communication with other external devices relies on other communication modes. This allows the signal control unit 120 to isolate/control various other communication modes to prevent inadvertent output of data (e.g., to prevent data transmitted unintentionally over the internet or to an external device).

In an additional variation of the system, the signal control unit 120 receives an electronic signal from the receiver and transmitter unit 102 and produces a decoded output signal. The signal control unit 120 is aware of which external devices are connected and active. Based on this information, the signal control unit 120 can produce an output signal for an HID. This HID output signal can be sent to the currently active end device. In one variation of the system, the signal control unit 120 more than external device can be connected to the signal control unit 120 but the signal control unit 120 is configured to only send the output signal to one device at a time. While the end devices can be paired in the host device 130 (e.g., by a caregiver), the user can control which device is active using neural signals. Pairing refers to the process that enables two electronic devices to establish a connection so they can communicate directly with each other, such as through Bluetooth wireless technology and often includes verification steps to ensure the connection is secure. Additionally, during the active HID session with the end device, another active session with the host device can be ongoing using a distinct wireless protocol, which allows for secure input/output to/from the signal control unit 120 to the host device that informs the configuration and control of the signal control unit 120. Additionally, or alternatively, a third “proto-profile” or distinct wireless signal based on a third wireless protocol may utilize input and output signals communicating with the operating system of the host device (e.g., iOS Switch Control or Assistive Touch) to allow the individual to control the desktop and any apps on the host device or an “end” device instead of the host device based on context data from the host device. By utilizing a plurality of distinct wireless profiles (protocols or modes), the signal control unit 120 can communicate adaptively with a plurality of connected devices based on the decoded signal and the connected devices with which the signal control unit 120 is communicating.

Figure 1D:
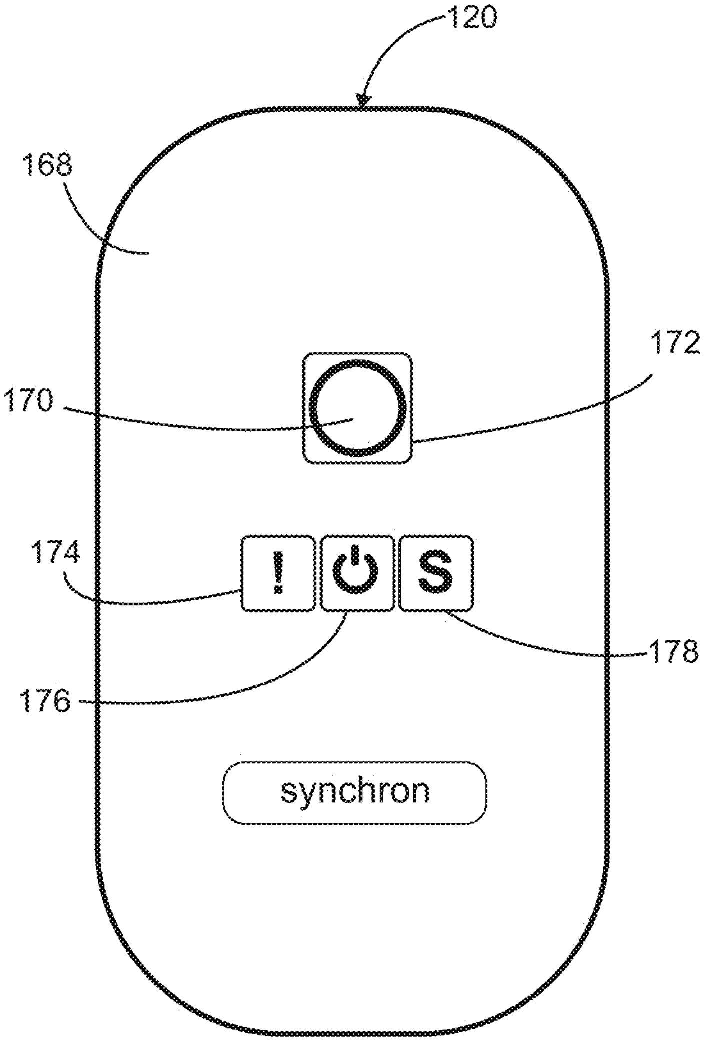
FIG. 1D illustrates an example of a portable signal control unit having a housing with a user interface on the housing.

FIG. 1D illustrates an example of a portable signal control unit 120 having a housing 168 with a minimal user interface on the housing to enable a lower power design as described herein. The housing 168 is selected to be portable (e.g., it can fit within the pocket of a garment or can be worn by the individual). The user interface is shown in FIG. 1D uses auditory, vibratory, and/or light feedback to provide user information. The housing 168 includes a power button 170 that can also toggle the signal control unit 120 between a locked and unlocked configuration as well as a sleep/low power mode. The power button 170 can be elastomeric or capacitive. The region 172 around the power button can provide general information. In the illustrated example, the information region 172 shows a ring-shaped light indicator to convey certain functions of the signal control unit 120. This light can vary in size and color and can pulsate to use varying frequencies of appearance to convey information. The housing 168 can also include a notification indicator 174 that can be used to call attention to system information such as errors or other notifications. The housing 168 can also include a power indicator 176 to show the power level/state of charge. Additionally, the housing 168 can include a connectivity indicator to convey the status of the signal control unit 120 connection with the receiver and transmitter unit or other component of the system. Variations of the signal control unit 120 can include any combination of the indicators described above. Moreover, in additional variations, the signal control unit 120 can include a detailed user interface rather than a limited user interface. Although not illustrated, the signal control unit 120 can include any additional ports, recovery buttons, speakers, etc.

The limited user interface with portable/small volume pocketable hardware provides a prosthetic hardware and functions to replace at least some lost mobility and function of the peripheral nervous system for the BCI user. To reduce power usage between user interactions host and end devices, the signal control unit 120 can be configured to disconnect any external device (e.g., host and/or external device) to save power when the receiver and transmitter unit 102 are in an idle mode. The signal control unit 120 can further leverage automation, or shortcuts, upon connection, to open the host device upon request of the signal control unit 120. The ability to monitor connected devices and selectively engage various communication modes can allow a signal control unit 120 to provide a BCI function for the user over a duration of at least 4, 8, 12, 24 hours on single battery charge, during which time the signal control unit 120 can receive, decode, and transmit distinct output signals to a plurality of external devices without external power. Accordingly, the signal control unit 120 can use information about the individual, including information about the components 130 that the individual interacts with, and use such information to improve decoding of the neural signal, as described below.

Figures 1E, 1F, 1G, 1H:
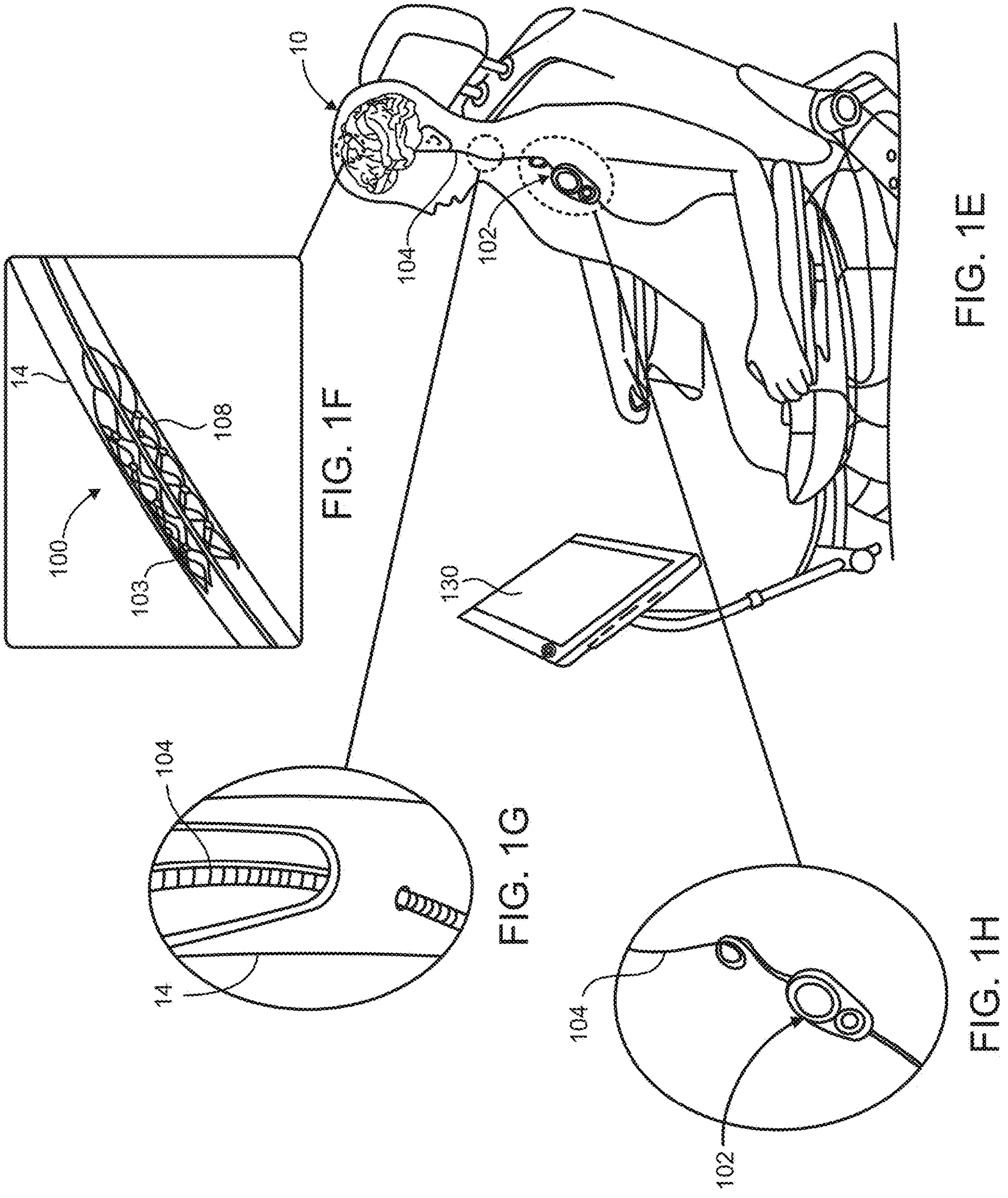
FIG. 1E illustrates one embodiment of a brain-computer interface (BCI) system.
FIG. 1F illustrates one embodiment of a stent-electrode array implanted within a brain vessel of an individual. The stent-electrode array can be one example of a recording device of the BCI system.
FIG. 1G illustrates a communication conduit connecting the stent-electrode array with a receiver and transmitter unit of the BCI system.
FIG. 1H illustrates a close-up view of an embodiment of the receiver and transmitter unit of the BCI system.

FIG. 1E illustrates another variation of a brain-computer interface (BCI) system used by individuals with mobility limitations to control peripheral devices such as personal electronic devices, internet of things (IoT) devices, or mobility vehicles or software applications running on such peripheral devices. An effective BCI system should allow the entire spectrum of individuals with mobility limitations to effectively control such peripheral devices or software applications, including those with severe mobility limitations, such as locked-in individuals. The individual controls a BCI system by regulating their brain activity, which is monitored by one or more components of the BCI system.

The BCI system can comprise a recording device or implant 100 (see FIG. 1F) and a computing device 130. Alternatively, as noted above, variations of the system can use a signal control unit. The recording device 100 can be configured to detect brain activity of the individual 10. The illustrated variation shows the recording device 100 100 is configured to be implanted within a brain vessel 104 of the individual as a stent 108 having multiple electrodes 103. The implant 100 can be implanted within a cortical or cerebral vein or sinus of the individual.

However, alternate configurations are within the scope of this disclosure, such as recording devices that are external to the body, as well as devices that are placed directly on or within brain tissue or placed on top of the brain tissue, under the dura. In other embodiments, the recording device 100 can be a non-invasive recording device 100 such as an electroencephalography (EEG) device (see, e.g., FIG. 2C), a functional magnetic resonance imaging (fMRI) device (see, e.g., FIG. 2E), or a functional near-infrared spectroscopy (fNIRS) device (see, e.g., FIG. 2F).

In other embodiments, the stent-electrode array 102 can be any of the stents, scaffolds, stent-electrodes, or stent-electrode arrays disclosed in U.S. Patent Pub. No. 2021/0365117; U.S. Patent Pub. No. 2021/0361950; U.S. Patent Pub. No. 2020/0363869; U.S. Patent Pub. No. 2020/0078195; U.S. Patent Pub. No. 2020/0016396; U.S. Patent Pub. No. 2019/0336748; U.S. Patent Pub. No. US 2014/0288667; U.S. Pat. No. 10,575,783; U.S. Pat. No. 10,485,968; U.S. Pat. Nos. 10,729,530, 10,512,555; U.S. Pat. App. No. 62/927,574 filed on Oct. 29, 2019; U.S. Pat. App. No. 62/932,906 filed on Nov. 8, 2019; U.S. Pat. App. No. 62/932,935 filed on Nov. 8, 2019; U.S. Pat. App. No. 62/935,901 filed on Nov. 15, 2019; U.S. Pat. App. No. 62/941,317 filed on Nov. 27, 2019; U.S. Pat. App. No. 62/950,629 filed on Dec. 19, 2019; U.S. Pat. App. No. 63/003,480 filed on Apr. 1, 2020; and U.S. Pat. App. No. 63/057,379 filed on Jul. 28, 2020, the contents of which are incorporated herein by reference in their entirety.

When the recording device 100 (e.g., the stent-electrode array 102) is implanted within a brain vessel 104 of the individual, each of the electrodes 103 of the recording device 100 can be configured to read or record the electrical activities of neurons within a vicinity of the electrode 103. The electrical activities of neurons are often recorded as rhythmic or repetitive patterns of activity that are also referred to as neural oscillations or brainwaves. Such neural oscillations or brainwaves can be further divided into bands by their frequency. For example, rhythmic neuronal activity between 14 Hz to 30 Hz is referred to as neuronal oscillations in a beta frequency range or beta-band.

When the 100 recording device (e.g., the stent-electrode array 100 of FIG. 1F) is implanted within a brain vessel 14 of the individual, the device 100 100 detects the neural oscillations of the individual, including any changes in such neural oscillations, over time in the beta-band (about 14 Hz to 30 Hz), alpha frequency range or alpha-band (about 7 Hz to 12 Hz), theta frequency range or theta-band (about 4 Hz to 7 Hz), gamma frequency range or gamma-band including a low-frequency gamma-band (about 30 Hz to 70 Hz) and a high-frequency gamma-band (about 70 Hz to 135 Hz), a delta frequency range or delta-band (about 0.1 Hz to 3 Hz), a mu frequency range or mu-band (about 7.5 Hz to 12.5 Hz), a sensorimotor rhythm (SMR) frequency range or SMR-band (about 12.5 Hz to 15.5 Hz), or a combination thereof. The device 100 can record changes in the power of such neural oscillations (e.g., as measured in decibels (dBs), micro-volts squared per Hz (μV2/Hz), average t-scores, average z-scores, etc.).

In some embodiments, the device 100 can be implanted within a cerebral or cortical vein or sinus of the individual or directly on or within brain tissue or placed on top of the brain tissue, under the dura. For example, the recording device 100 can be implanted within a superior sagittal sinus, an inferior sagittal sinus, a sigmoid sinus, a transverse sinus, a straight sinus, a superficial cerebral vein such as a vein of Labbe, a vein of Trolard, a Sylvian vein, a Rolandic vein, a deep cerebral vein such as a vein of Rosenthal, a vein of Galen, a superior thalamostriate vein, an inferior thalamostriate vein, or an internal cerebral vein, a central sulcal vein, a post-central sulcal vein, or a pre-central sulcal vein. In certain embodiments, the recording device 100 can be implanted within a vessel extending through a hippocampus or amygdala of the individual.

FIG. 1G illustrates that a communication conduit or lead 104 (e.g., a lead wire) can connect the recording device 100 with a receiver and transmitter unit 102 (FIG. 1H) that is communicatively coupled to the computing device 130 or a signal control unit as described above. Alternatively, the lead 104 can connect the recording device 100 directly with any external electronic device (e.g., a computing device 130).

The lead 104 can be a biocompatible wire or cable. When the device 100 is a stent-electrode array 102 deployed within a brain vessel (e.g., the superior sagittal sinus) 14 of the individual, the lead 104 can extend through one or more brain vessels and out through a wall of a vein of the individual. The lead 104 can be positioned under the skin of the individual to a region of the individual (e.g., beneath the pectoralis major muscle) where the receiver and transmitter unit receiver and transmitter 102 are implanted.

FIG. 1H illustrates a close-up view of an embodiment of a receiver and transmitter unit 102 receiver and transmitter. In some embodiments, the receiver and transmitter unit 102 can be configured to transmit signals received from the recording device 100 to the computing device 130 for processing and analysis. The receiver and transmitter unit 102 can also serve as a communication hub between the recording device 100 and the computing device 130. In certain embodiments, the computing device 130 can transmit commands or signals to the receiver and transmitter unit 102 to generate certain user outputs. Generating user outputs to train the individual to better control the BCI system 100 will be discussed in more detail in later sections.

In certain embodiments, the receiver and transmitter unit 102 can be an internal receiver and transmitter unit 102 implantable under the skin of the individual. For example, the receiver and transmitter unit 102 can be implanted within a pectoral region or within a subclavian space of the individual. In additional variations, an receiver and transmitter unit can be implanted in any location within the body (e.g., within a skull) or located entirely or partially outside of the body.

In other embodiments, the receiver and transmitter unit 102 can be an external receiver and transmitter unit 102 not implanted within the individual. In these embodiments, the lead 104 can extend through the skin of the individual to connect to the receiver and transmitter unit 102. In additional embodiments, the receiver and transmitter unit 102 can comprise both an implantable portion and an external portion.

In some embodiments, the receiver and transmitter unit 102 can transmit data or signals to the computing device 130 or receive data or commands from the computing device 130 via a wired connection. In other embodiments, the receiver and transmitter unit 102 can transmit data or signals to the computing device 130 or receive data or commands from the computing device 130 via a wireless communication protocol such as Bluetooth™, Bluetooth Low Energy (BLE), ZigBee™, WiFi, or a combination thereof and as described above.

Figure 1I:
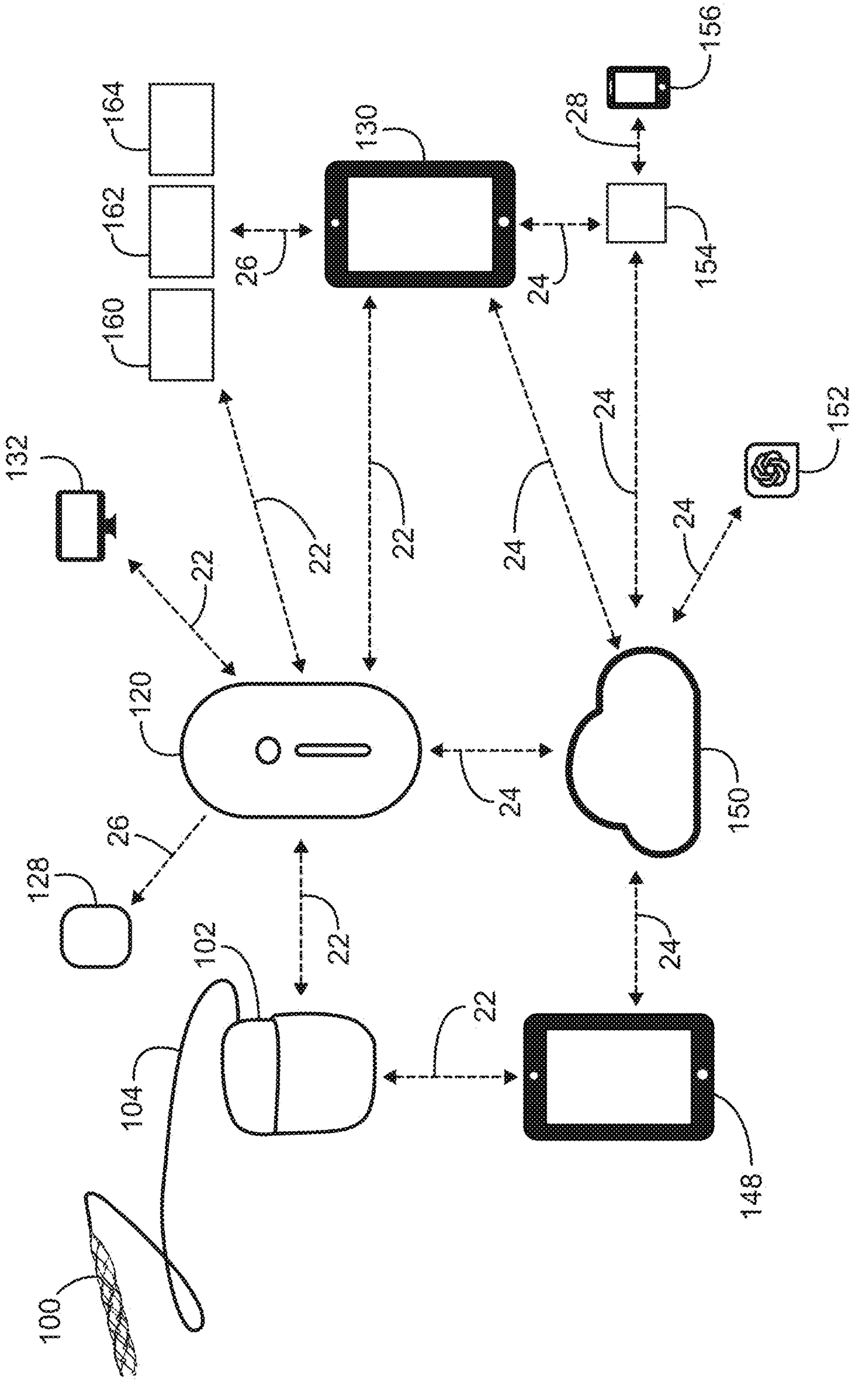
FIG. 1I illustrates an additional variation of an interface system, where the multiple and distinct communication channels of the signal control unit allow an individual BCI user to operatively engage one or more external devices to improve autonomy for the individual.

FIG. 1I illustrates an additional variation of where a BCI (device 100, lead 104, and receiver and transmitter unit 102 coupled to an individual BCI user) is configured to use multiple and distinct communication channels of the signal control unit 120 to allow an individual BCI user to operatively engage one or more external devices to improve autonomy for the individual. The neural interface device 100 detects a brain signal or neural activity from the individual and is electrically coupled with a receiver and transmitter unit/component 102. Upon receiving a signal from the electrode component 100, the receiver and transmitter component transmits an electronic signal representative of the brain signal to the signal control unit 120. In one variation, the receiver and transmitter unit 102 transmits the electronic signal representative of the brain signal to the signal control unit 120 using a BLE transmission 22. As noted herein, the use of BLE allows for reduced power demands from the receiver and transmitter unit 102. However, additional variations of the systems and methods disclosed herein can use any wireless transmission modality as discussed herein. The system shown in FIG. 1I is further discussed in U.S. patent application Ser. No. 18/882,591, which is incorporated by reference in its entirety.

It is noted that FIG. 1I illustrates various specific wireless transmission modalities between the various components. For example, BLE 22, network/internet/HTTPS 24, UHF 26, short messaging service "SMS" 28. These specific wireless transmission modalities demonstrate one variation of an improved BCI device (100, 104, 102, 120, 130) operating in a much larger system. However, additional configurations of the system contemplate any wireless transmission modality being used between any components of the system.

The variation of the system shown in FIG. 1I includes a signal control unit 120 having a housing structure that is physically separate from the neural interface device (100, 102, 104) and is configured to be portable such that signal control unit 120 can remain with the individual while remaining in operative engagement the system. The signal control unit 120 processes the electronic signal representative of the brain signal using one or more processors that apply one or more algorithms to decode the electronic signal from the transmission component. As noted above, variations of the system include performing all or the majority processing of the electronic signal within the signal control unit 120. However, additional variations can include performing processing of the signal within one or more processors of the receiver and transmitter unit 102. Alternatively, or in combination, some processing can occur through external processing from a host device 130 or via one or more cloud-based networks 150.

Once the system that the electronic signal is representative of an intentional neural brain signal generated by the individual, the signal control unit 120 can transmit an output signal to one or more external devices using the signal control unit. In the illustrated variation, the signal control unit 120 exchanges data via a BLE transmission 22 with a personal host device 130 (such as a tablet computer, a computer, or other electronic device). However, additional variations of the system can include the signal control unit 120 directly communicating with other external electronic devices 160, 162, 164.

In some variations, the signal control unit 120 is configured to work with one or more end devices 132, where an end device is any digital device that supports HID profiles for a keyboard, mouse, or other peripheral devices. Interconnectivity with end devices in the individual's home can leverage traditional pass-key pairing to a BLE HID device with the help of the host device 130. In one example, an end device can include an eye-tracker or other applications that assist the individual in using the BCI interface, or advanced mixed-reality headsets that enable a "spatial computer" that merges digital content with the physical environment such as the Apple Vision Pro and Meta's Quest Pro and Quest 3.

Variations of the system include a host device 130 that supports secure and proprietary communication with the signal control unit 120 and provides the necessary user interface to support individual training and use of the entire BCI system. Individuals can use their host device to control a wide variety of applications, including but not limited to texting, writing documents, using social media, internet communications, shopping, interaction with home appliances and home automation, health applications, banking applications, etc.

The system shown in FIG. 1I also contemplates that one or more of the external electronic devices 130, 160, 162, 164 generate or pass data ("device data"). This device data is transmitted to the signal control unit 120, which can then transmit the device data back to any of the external electronic devices 130, 160, 162, 164.

FIG. 1I illustrates that the interface system can interact with cloud-based software and data through various communication pathways. In one variation, various host devices 130 can be synchronized with the cloud-based 150 data for a variety of purposes. The cloud network 150 can also store proprietary software relating to system components as well as authentication and certificate services, which are used both during product use and for production, manufacture, and installation of the system. The internet connection 24 (between the signal control unit 120 and cloud 150) can also be used to generate online notifications to a caregiver. In the example shown, the signal control unit 120 can send data to the cloud 150 that ultimately goes to a caregiver's cell phone 28 via SMS 154 messaging. Likewise, the caregiver can communicate with the user's host device 130 via SMS 154 or directly to the signal control unit 120 via the internet connection.

The system network and communication channels allow cloud connectivity for various individuals to monitor and review the performance of the BCI user to provide assistance or to improve the performance of the system. In some variations, the cloud network 150 stores neural data from the individual (or various other individuals) and can convey requests to third-party services, including support for notification use cases described in more detail elsewhere herein.

The cloud-network 150 also allows the system to access artificial intelligence (AI) that can be transmitted to any component of the system. In the example shown, the AI involves a large language model 152 that assists the BCI user to communicate with others by providing generative content as described in U.S. application Ser. No. 18/734,476 filed on Jun. 5, 2024, the entirety of which is incorporated by reference.

One additional benefit of the interface systems and methods described herein is that the low power, portability, and a number of distinct wireless communication modalities offer an "always-on" functionality. For example, given that the receiver and transmitter unit 102 is charged and the signal control unit 120 and host device 130 are powered, then the individual can use the complete system independently and on-demand for an extended period (e.g., 24 hours or more). This always-on feature allows the individual the ability to engage in digital daily living activities like telehealth, social media, communication, or adjusting interacting with various home interface systems that are based automation or control of appliances (e.g., 160, 162, 164). More importantly, the always-on feature can assist by providing potentially lifesaving messages to caregivers. By having the ability to run the system on battery power for an extended period allows this notification capability to work outside, away from home, and generally without the internet. Without an internet connection the system can still communicate to other devices, either in the individual's home (160, 162, 164) or to devices outside of the home. The signal control unit 120 can also communicate with devices if the host device 130 is offline. For example, the signal control unit 120 can send signals to one or more alert devices 128 using low power device 433 MHz. The always-on feature also allows the user to transition from an idle state and immediately request caregiver assistance (e.g. if the individual awakes at night and can instantly message a caregiver).

Another benefit of the system described includes selective control between a host 130 and any number of the external devices 160, 162, 164, where the control is adaptive based on detected bonding and/or active connections between the signal control unit 132 device and external devices 160, 162, 164 and based on differentiated intent information (confirmation of the intentional neural brain signal generated by the individual and decoded into an electronic signal transmitted to the SCU). An active connection means that the external device is bonded to the host 130 and active such that the external device is ready to exchange data with the host.

Adaptive control can occur with the host device 120 as well as any number of external devices selected by the user through the use of the signal control unit. The signal control unit 120, through bonding as discussed above, knows which devices are connected, and the signal control unit 120 translates the decoded intent signals generated by the individual adaptively based thereon. The term "bonding" is intended to refer to a relationship established between two devices, allowing for secure reconnection without re-pairing. This can be accomplished by the host device or any device in the system. In some cases, term pairing includes any process where devices exchange the information necessary to establish a connection or an encrypted connection.

As the signal control unit 120 translates the decoded signal into one or more output signals, the signal control unit 120 can use information on the number of bonded devices to take into account how to relay the output signal. This allows the BCI user individual autonomous control of interactions with a variety of different external devices without dependence on a caregiver. As one example, as noted above, if the individual generates an intent to contact a caregiver, once this intent is sent to the signal control unit for decoding and confirmation, the signal control unit 120 can generate an output command based on the bonded devices available. If the BCI user is in a situation where there are no bonded devices or if there is no network connectivity, then the signal control unit 120 can transmit the output through a fallback communication protocol (e.g., 433 MHz to an alert device 128). This capability can also be applied to system warnings.

In one variation, the BCI system can be configured to monitor the ability of the system to detect a brain signal from the user and determine that the electronic signal associated is representative of an intentional neural brain signal generated by the individual. In some cases, an individual might suffer from deteriorating health such that the signals generated by the brain change or deteriorate, causing a BCI system that once was properly functioning to no longer function due to the deteriorating condition of the individual. In such a case, the signal control unit 120 can be configured to provide notice to a caregiver or other medical practitioner.

In an additional variation of the system shown in FIG. 1I, the signal control unit 120 receives an electronic signal from the receiver and transmitter unit 102 and produces a decoded output signal. The signal control unit 120 is aware of which external devices are connected and active. Based on this information, the signal control unit 120 can produce an output signal for an HID. This HID output signal can be sent to the currently active end device. In one variation of the system, the signal control unit 120 more than external device can be connected to the signal control unit 120 but the signal control unit 120 is configured to only send the output signal to one device at a time. While the end devices can be paired in the host device 130 (e.g., by a caregiver), the user can control which device is active using neural signals. Additionally, during the active HID session with the end device, another active session with the host device can be ongoing using a distinct wireless protocol, which allows for secure input/output to/from the signal control unit 120 to the host device that informs the configuration and control of the signal control unit 120. Additionally or alternatively, a third "proto-profile" or distinct wireless signal based on a third wireless protocol may utilize input and output signals communicating with the operating system of the host device (e.g., iOS Switch Control or Assistive Touch) to allow the individual to control the desktop and any apps on the host device or an "end" device instead of the host device based on context data from the host device. By utilizing a plurality of distinct wireless profiles (protocols or modes), the signal control unit 120 can communicate adaptively with a plurality of connected devices based on the decoded signal and the connected devices with which the signal control unit 120 is communicating.

Figure 3A:
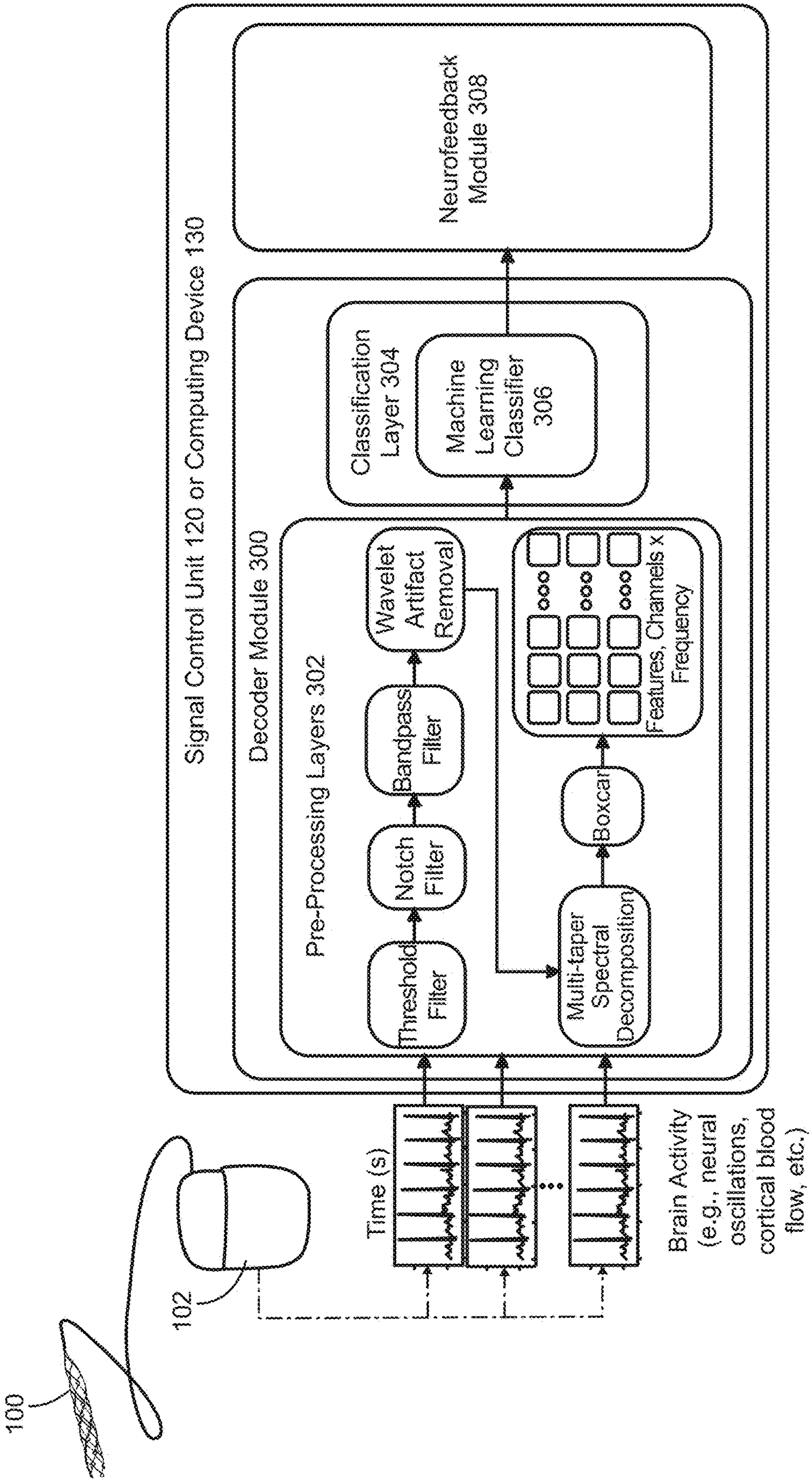
FIG. 3A illustrates certain software layers or modules running on a computing device of the BCI system.
Figure 3B:
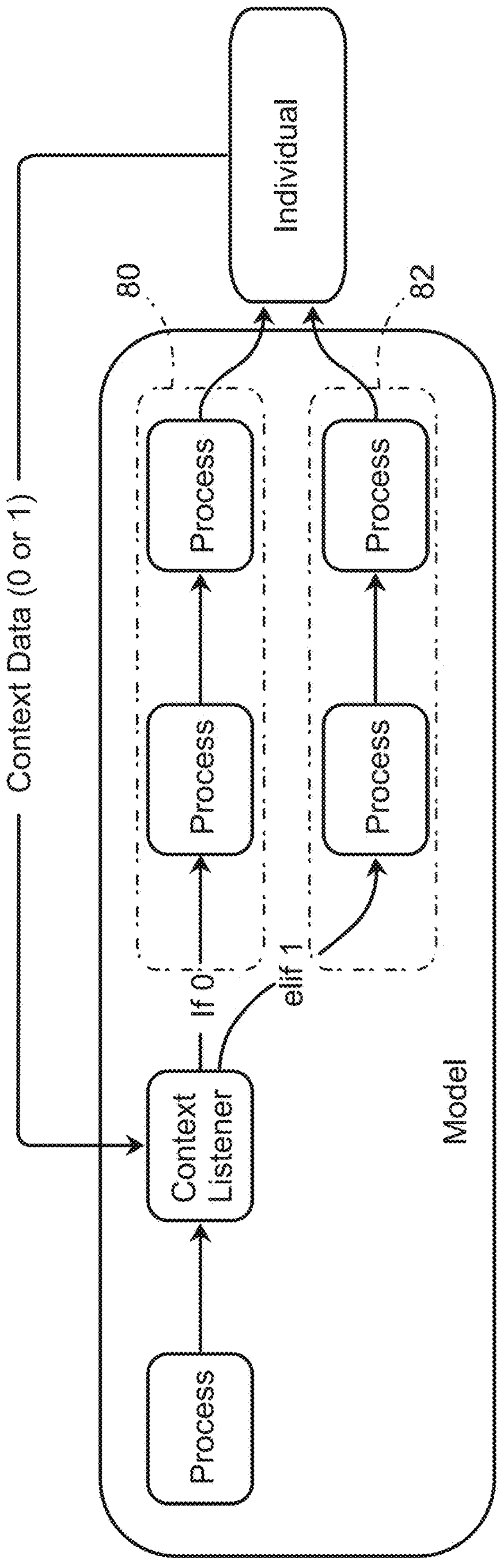
FIG. 3B illustrates a basic example of using context to determine which decoder that is used to decode a signal in a BCI.
Figure 4A:
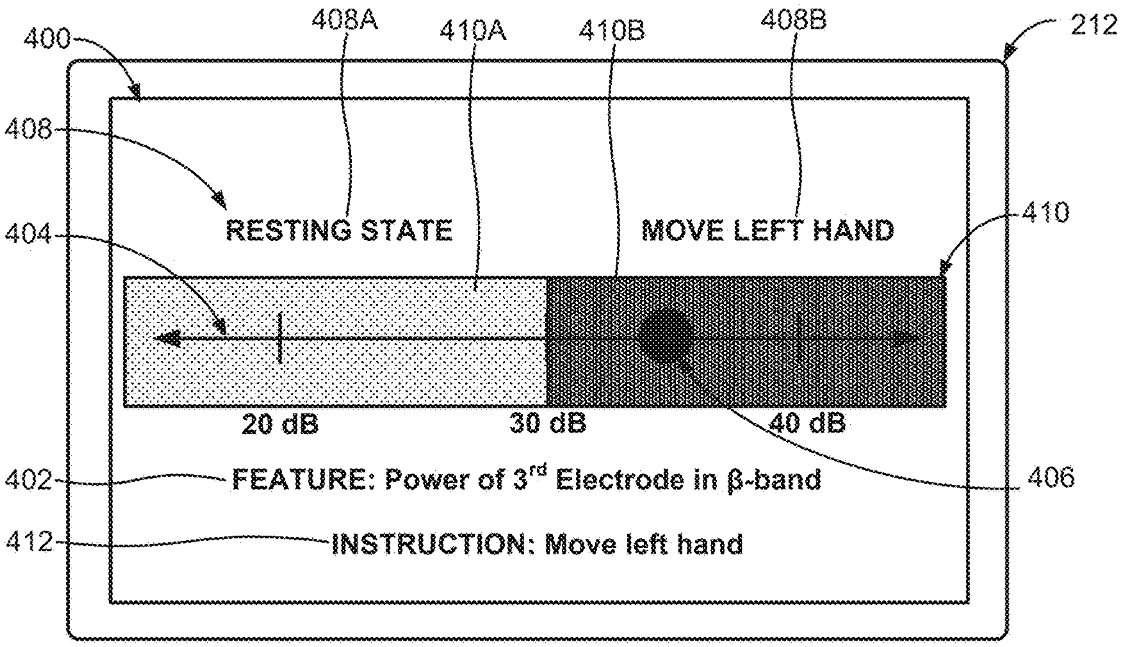
FIG. 4A illustrates one embodiment of a neurofeedback graphical user interface (GUI).
Figure 4B:
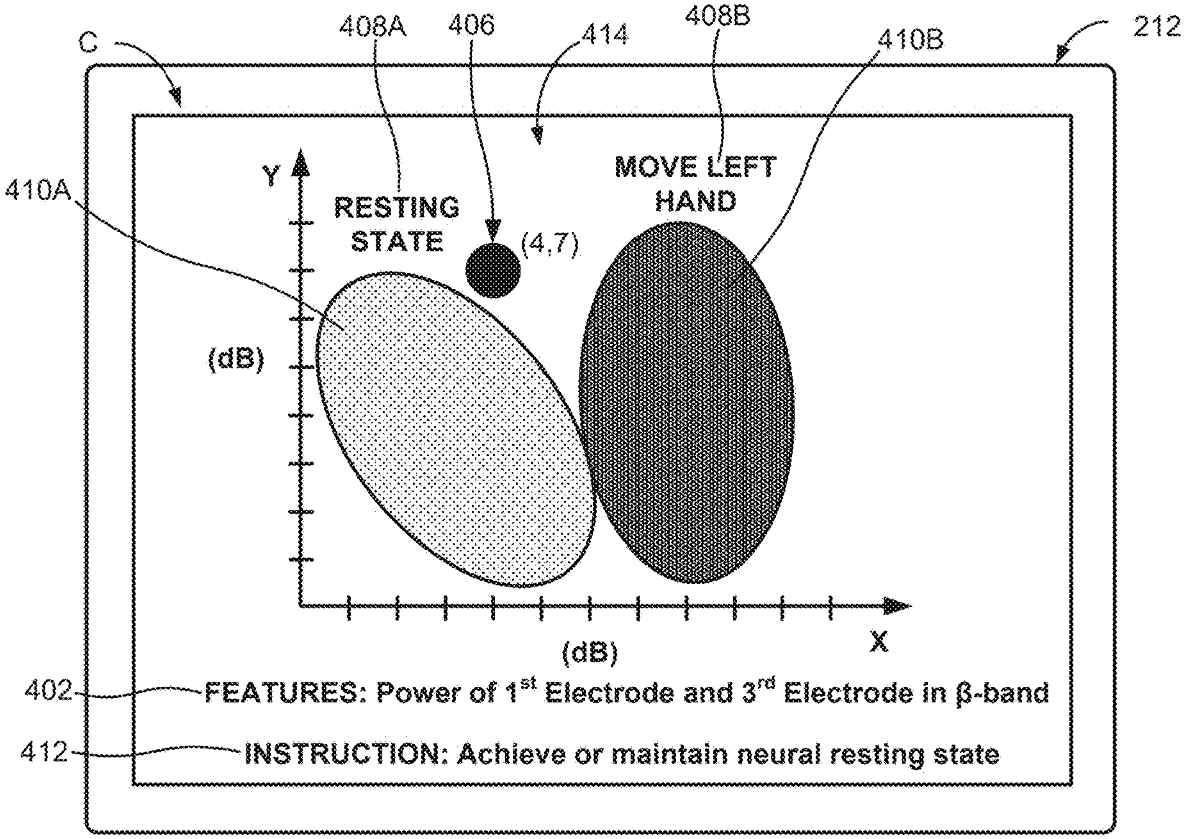
FIG. 4B illustrates another embodiment of the neurofeedback GUI.
Figure 4C:
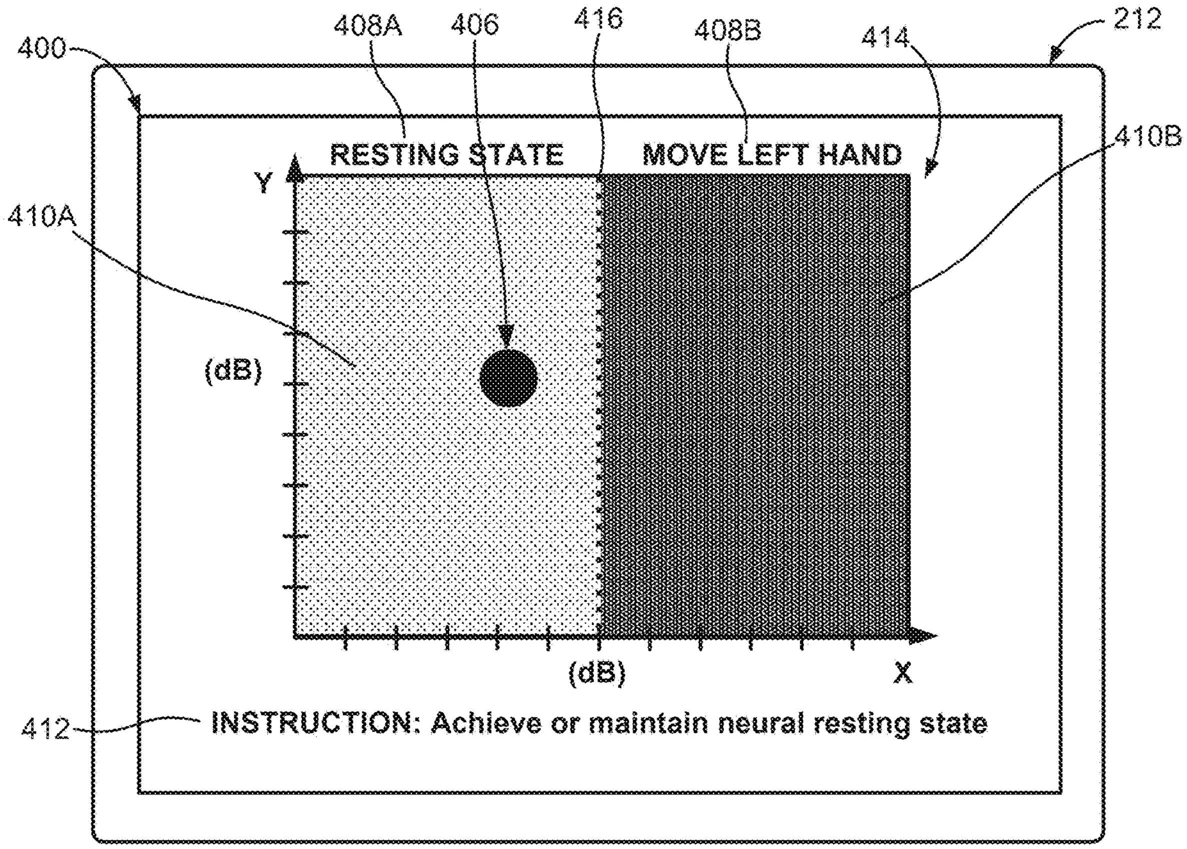
FIG. 4C illustrates yet another embodiment of the neurofeedback GUI.
Figure 4D:
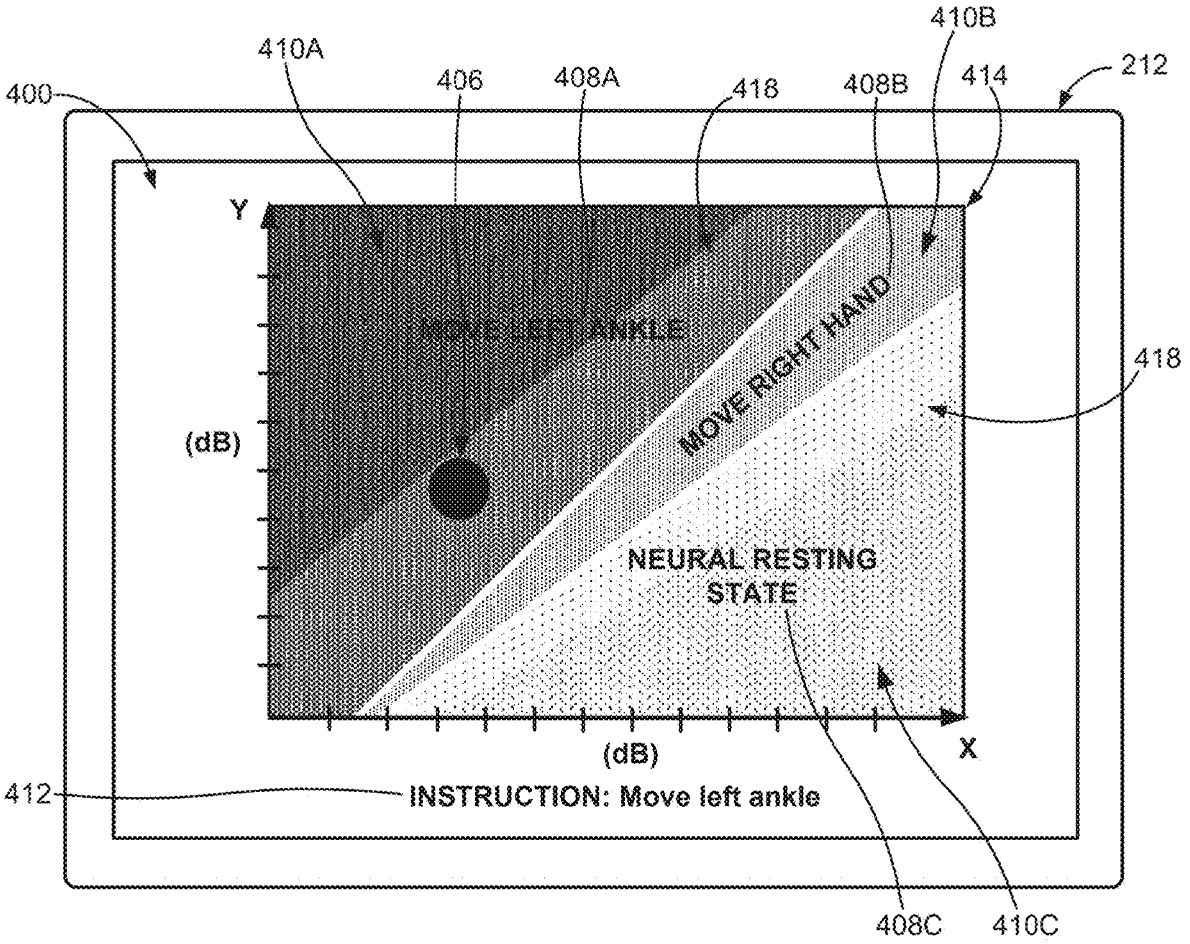
FIG. 4D illustrates an additional embodiment of the neurofeedback GUI.
Figure 4E:
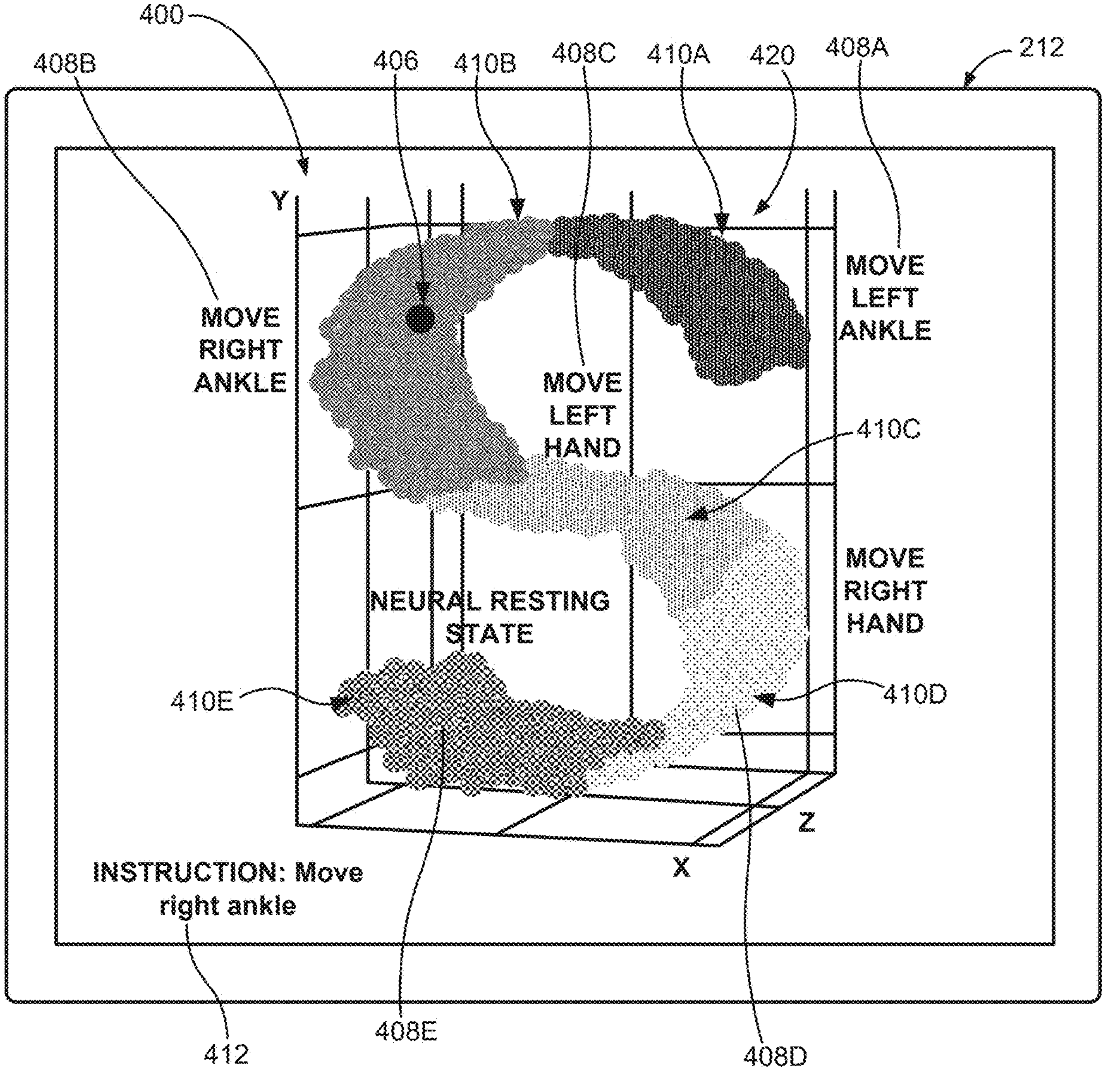
FIG. 4E illustrates a further embodiment of the neurofeedback GUI.
Figure 5A:
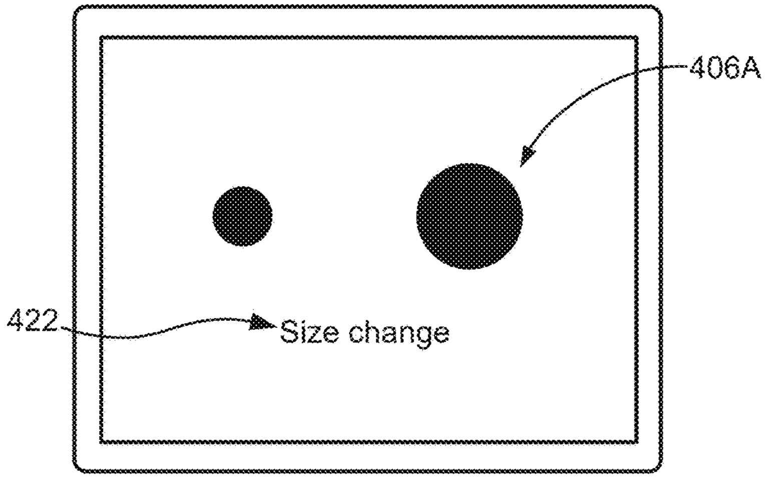
FIG. 5A illustrates one embodiment of a graphic element displayed to the individual representing a current brain activity of the individual.
Figure 5B:
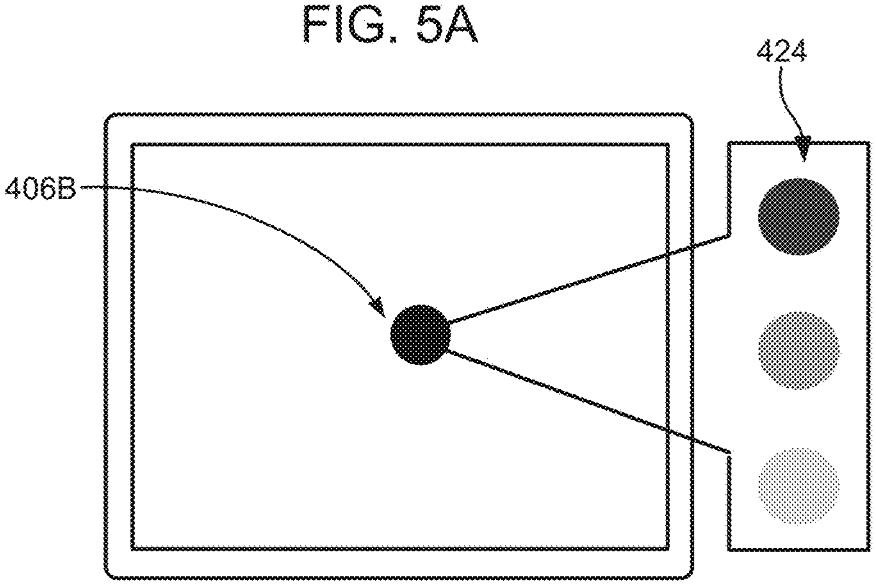
FIG. 5B illustrates another embodiment of a graphic element displayed to the individual representing a current brain activity of the individual.
Figure 5C:
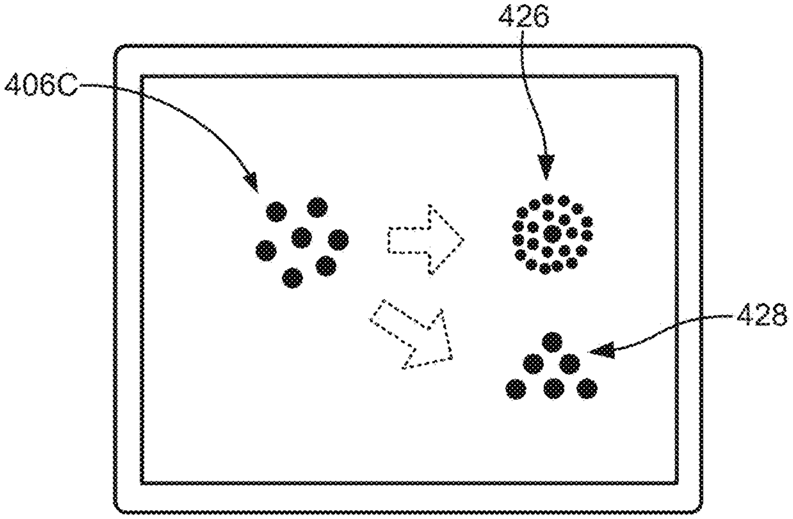
FIG. 5C illustrates yet another embodiment of a graphic element displayed to the individual representing a current brain activity of the individual.
Figure 6:
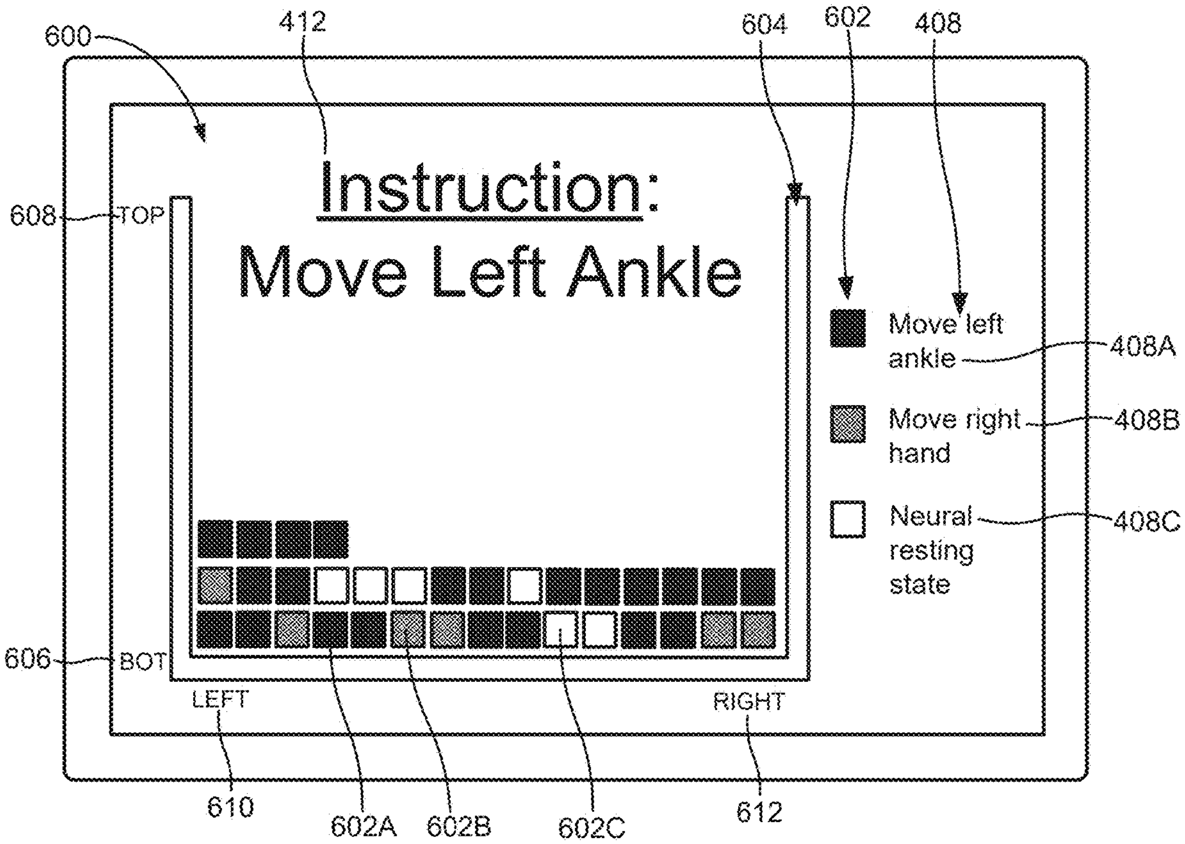
FIG. 6 illustrates an embodiment of a neurofeedback GUI comprising graphic elements displayed in temporal succession.
Figure 7:
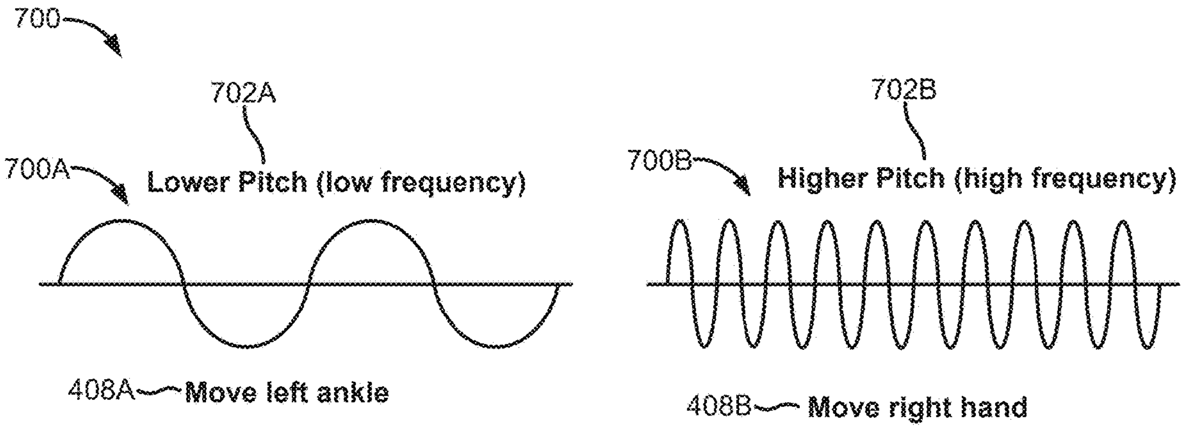
FIG. 7 illustrates examples of different types of sounds that can be generated by an auditory feedback component.
Figure 8:
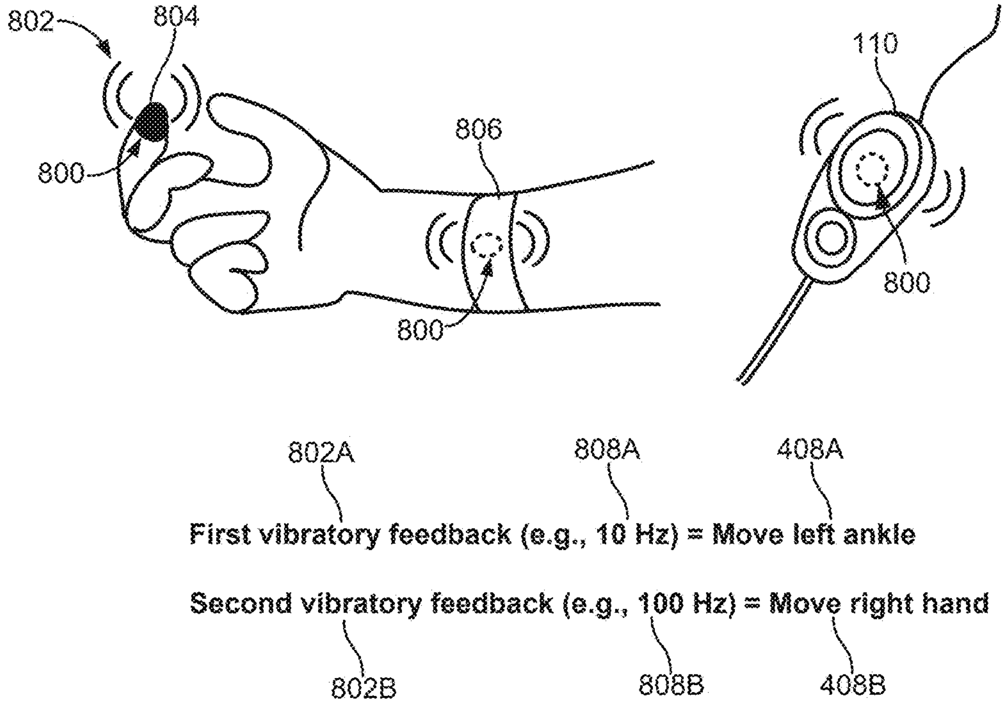
FIG. 8 illustrates examples of different types of tactile feedback components that can generate tactile feedback that can be felt by the individual.

In some variations of the system, a connection between a signal control unit 120 and a host device 130 is immediately disconnected after data transfer and when data is not being transferred between the signal control unit 120 and host device 130 to preserve power. However, this can increase the latency of the system. In order to improve the user experience for the systems described in this disclosure, e.g., as shown in FIGS. 3A and 3B, the components of the system can be configured to minimize system latency so that the user can use brain activity to engage with host/external devices. For example, both the host and end devices can keep their connections active when the signal control unit 120 is in use. This can allow a low system latency (e.g., less than 100 ms) from detection of the neural signal, transmission and wireless receipt of the signal by the signal control unit 120, decoding and translation of neural signal to an output signal using the signal control unit 120, and transmission of a second wireless transmission from the signal control unit 120 to one or more external devices. The selective control between host and end devices can be adaptive based on detected bonds (between the signal control unit 120 and external devices) and differentiated intent information (decoded signals from the neural signals received from the electrode device and decoded by the signal control unit 120 device).

FIG. 1I provides just one illustration of the variety of electronic devices and systems that allow for interaction by the individual user of the BCI. As discussed above, the implant 100, signal control unit 102, and receiver and transmitter unit 102 are either implanted or with the individual. Accordingly, the signal control unit 120 can monitor the individual for physiological data, data related to actions taken by the individual when accessing one or more devices, or by monitoring the types of devices that the individual can access using the system. Accordingly, as discussed below, the decoding algorithms that are used to translate the neural activity to an actionable electronic command can dynamically and adaptively change to produce different or altered outputs based on this monitoring data/factors related to the individual. Such contextualized decoding is intended to better assist the individual when using the BCI and allows for the application of a decoding algorithm that is best suited to the activity that the individual is undertaking. For example, such factors can include the selection of certain decoding algorithms based on the type of electronic device that is either engaged with the system or the electronic device that the individual is presently using. Such data can be generated by the external devices (e.g., 130, 148, 160, 162, 164) or by a processor (e.g., in the signal control unit 120). Or by additional sensors that monitor the individual.

Figure 2A:
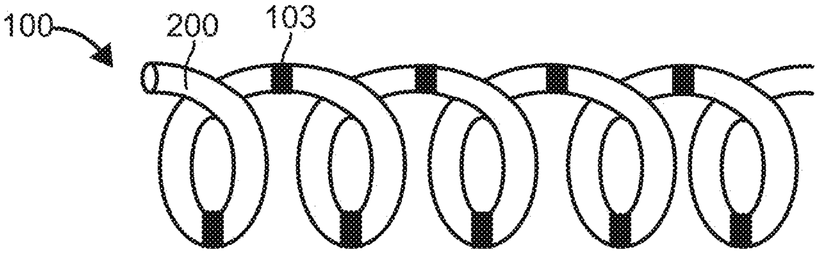
FIG. 2A illustrates an embodiment of a coiled wire carrying a plurality of electrodes. The coiled wire can be another example of the recording device of the BCI system.

FIG. 2A illustrates another variation of a recording device 100 as a coiled wire 200 comprising a plurality of electrodes 103. The coiled wire 200 can serve as the endovascular carrier for the electrodes 103 and can be used in vessels that are too small to accommodate the stent-electrode array 102. The coiled wire 200 can be a biocompatible wire or microwire configured to wind itself into a coiled pattern or a substantially helical pattern. The electrodes 103 can be arranged such that the electrodes 103 are scattered along a length of the coiled wire 200. More specifically, the electrodes 103 can be affixed, secured, or otherwise coupled to distinct points along a length of the coiled wire 200.

The electrodes 103 can be separated from one another such that no two electrodes 103 are within a predetermined separation distance (e.g., at least 10 μm, at least 100 μm, or at least 1.0 mm) from one another. In some embodiments, the wire 200 can be configured to automatically wind itself into a coiled configuration (e.g., helical pattern) when the wire 200 is deployed out of a delivery catheter. For example, the coiled wire 200 can automatically attain its coiled configuration via shape memory when the delivery catheter or sheath is retracted. The coiled configuration or shape can be a preset or shape memory shape of the wire 200 prior to the wire 200 being introduced into a delivery catheter. The preset or pre-trained shape can be made to be larger than the diameter of the anticipated deployment or implantation vessel to enable the radial force exerted by the coils to secure or position the coiled wire 200 in place within the deployment or implantation vessel.

The wire 200 can be made in part of a shape-memory alloy, a shape-memory polymer, or a combination thereof. For example, wire 200 can be made in part of Nitinol (e.g., Nitinol wire). The wire 200 can also be made in part of stainless steel, gold, platinum, nickel, titanium, tungsten, aluminum, nickel-chromium alloy, gold-palladium-rhodium alloy, chromium-nickel-molybdenum alloy, iridium, rhodium, or a combination thereof.

Figure 2B:
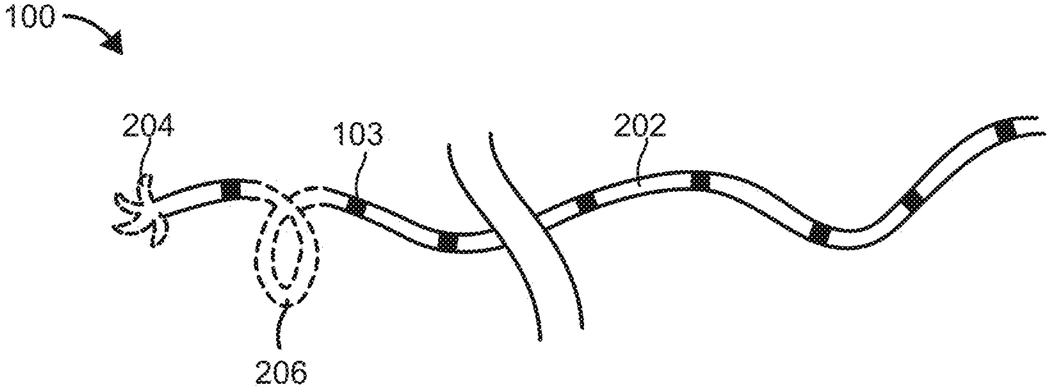
FIG. 2B illustrates an embodiment of an anchored wire carrying a plurality of electrodes. The anchored wire can be another example of the recording device of the BCI system.

FIG. 2B illustrates yet another variation of the recording device 100 as an anchored wire 202 comprising a plurality of electrodes 103. The anchored wire 202 can serve as the endovascular carrier for the electrodes 103 and can be used in vessels that are too small to accommodate either the coiled wire 200 or the stent-electrode array 102. The anchored wire 202 can comprise a biocompatible wire or microwire attached or otherwise coupled to an anchor or another type of endovascular securement mechanism. FIG. 2B illustrates that the anchored wire 202 can comprise a barbed anchor 204, a radially-expandable anchor 206, or a combination thereof (both the barbed anchor 204 and the radially-expandable anchor 206 are shown in broken or phantom lines in FIG. 2B). In some embodiments, the barbed anchor 204 can be positioned at a distal end of the anchored wire 202. In other embodiments, the barbed anchor 204 can be positioned along one or more sides of the wire or microwire. The barbs of the barbed anchor 204 can secure or moor the anchored wire 202 to an implantation site within the individualindividual. The radially-expandable anchor 206 can be a segment of the wire or microwire shaped as a coil or loop. The coil or loop can be sized to allow the coil or loop to conform to a vessel lumen and to expand against a lumen wall to secure the anchored wire 202 to an implantation site within the vessel. For example, the coil or loop can be sized to be larger than the diameter of the anticipated deployment or implantation vessel to enable the radial force exerted by the coil or loop to secure or position the anchored wire 202 in place within the deployment or implantation vessel.

The electrodes 103 of the anchored wire 202 can be scattered along a length of the anchored wire 202. More specifically, the electrodes 103 can be affixed, secured, or otherwise coupled to distinct points along a length of the anchored wire 202. The electrodes 103 can be separated from one another such that no two electrodes 103 are within a predetermined separation distance (e.g., at least 10 μm, at least 100 μm, or at least 1.0 mm) from one another. Although FIG. 2B illustrates the anchored wire 202 having only one barbed anchor 204 and one radially-expandable anchor 206. It is contemplated by this disclosure that the anchored wire 202 can comprise a plurality of barbed anchors 204 and/or radially-expandable anchors 206.

Figure 2C:
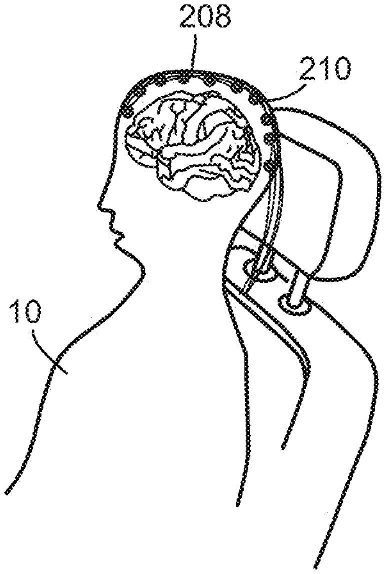
FIG. 2C illustrates one embodiment of an electroencephalogram (EEG) device serving as the recording device of the BCI system.

FIG. 2C illustrates another variation of a recording device 100 that can be a non-invasive device such as an electroencephalogram (EEG) device 208. The EEG device 208 can be a head-mounted EEG apparatus. For example, the EEG device 208 can be an EEG cap or an EEG-visor configured to be worn by the individual. The EEG device 208 can comprise a plurality of non-invasive electrodes 210 configured to be in contact with the scalp of the individual.

The brain activity detected by the EEG device 208 can be neural oscillations or brainwaves of the individual, similar to those recorded by the recording device 100. For example, the EEG device 208 can record neural oscillations, including any changes in such neural oscillations, over time in the beta-band (about 14 Hz to 30 Hz), alpha frequency range, or alpha-band (about 7 Hz to 12 Hz), theta frequency range or theta-band (about 4 Hz to 7 Hz), gamma frequency range or gamma-band including a low frequency gamma-band (about 30 Hz to 70 Hz) and a high frequency gamma-band (about 70 Hz to 135 Hz), a delta frequency range or delta-band (about 0.1 Hz to 3 Hz), a mu frequency range or mu-band (about 7.5 Hz to 12.5 Hz), a sensorimotor rhythm (SMR) frequency range or SMR-band (about 12.5 Hz to 15.5 Hz), or a combination thereof. The EEG device 208 can record changes in the power of such neural oscillations (e.g., as measured in decibels (dBs), micro-volts squared per Hz (μV2/Hz), average t-scores, average z-scores, etc.).

Figure 2D:
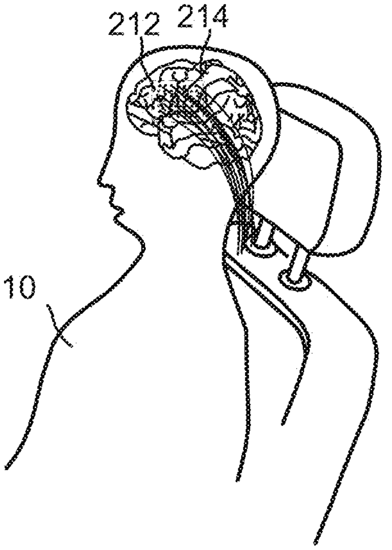
FIG. 2D illustrates one embodiment of an electrocorticography (ECoG) device serving as the recording device of the BCI system.

FIG. 2D illustrates that in yet another embodiment of the system 100, the recording device 100 can be an electrocorticography (ECoG) device 212 (also referred to as an intracranial EEG device). The ECoG device 10 can be a flexible or stretchable electrode mesh or one or more electrode patches implanted or placed on a surface of the brain of the individual. The electrode-mesh or electrode patch can comprise a plurality of electrodes 214 arranged on the mesh or patch, respectively.

The brain activity detected by the ECOG device 212 can be neural oscillations or brainwaves of the individual 14, similar to those recorded by the stent-electrode array 102. For example, the ECoG device 212 can record neural oscillations, including any changes in such neural oscillations, over time in the beta-band (about 14 Hz to 30 Hz), alpha frequency range, or alpha-band (about 7 Hz to 12 Hz), theta frequency range or theta-band (about 4 Hz to 7 Hz), gamma frequency range or gamma-band including a low-frequency gamma-band (about 30 Hz to 70 Hz) and a high-frequency gamma-band (about 70 Hz to 135 Hz), a delta frequency range or delta-band (about 0.1 Hz to 3 Hz), a mu frequency range or mu-band (about 7.5 Hz to 12.5 Hz), a sensorimotor rhythm (SMR) frequency range or SMR-band (about 12.5 Hz to 15.5 Hz), or a combination thereof. The ECoG device 212 can record changes in the power of such neural oscillations (e.g., as measured in decibels (dBs), micro-volts squared per Hz (μV2/Hz), average t-scores, average z-scores, etc.).

Figure 2E:
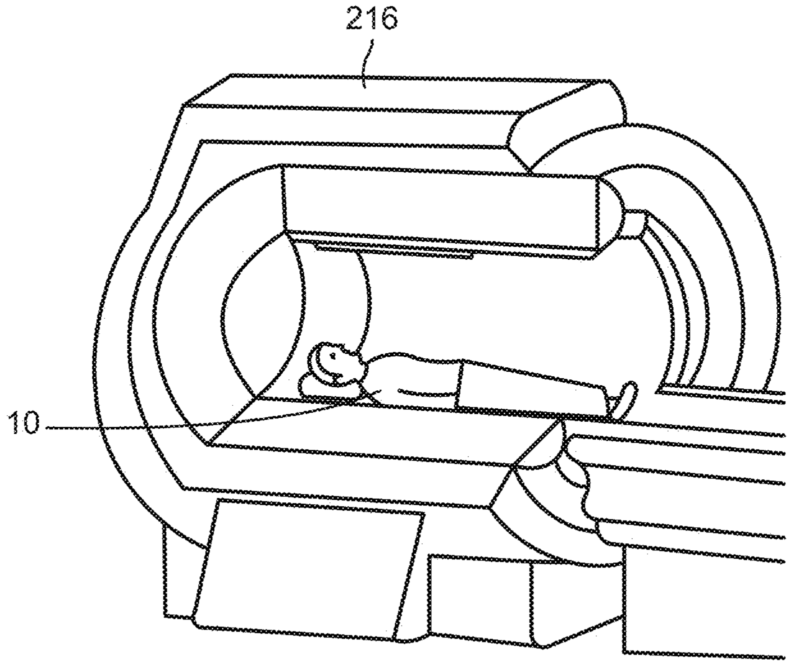
FIG. 2E illustrates one embodiment of a functional magnetic resonance imaging (fMRI) device serving as the recording device of the BCI system.

FIG. 2E illustrates another variation of the recording device that uses a functional magnetic resonance imaging (fMRI) machine 216. The fMRI machine 216 can detect changes in blood flow and blood-oxygen levels within the brain of the individual as the individual 14 engages in neural activity as part of the neurofeedback training. Such changes in blood flow and blood-oxygen levels are the indirect consequence of the individual's neural activity.

In some embodiments, the fMRI machine 216 can measure the brain activity of the individual using blood-oxygen-level dependent (BOLD) contrast imaging. For example, the brain activity of the individual 14 can be expressed as changes in the BOLD signal. In other embodiments, the fMRI machine 216 can measure the brain activity of the individual using arterial spin labeling (ASL) rather than BOLD contrast imaging.

Figure 2F:
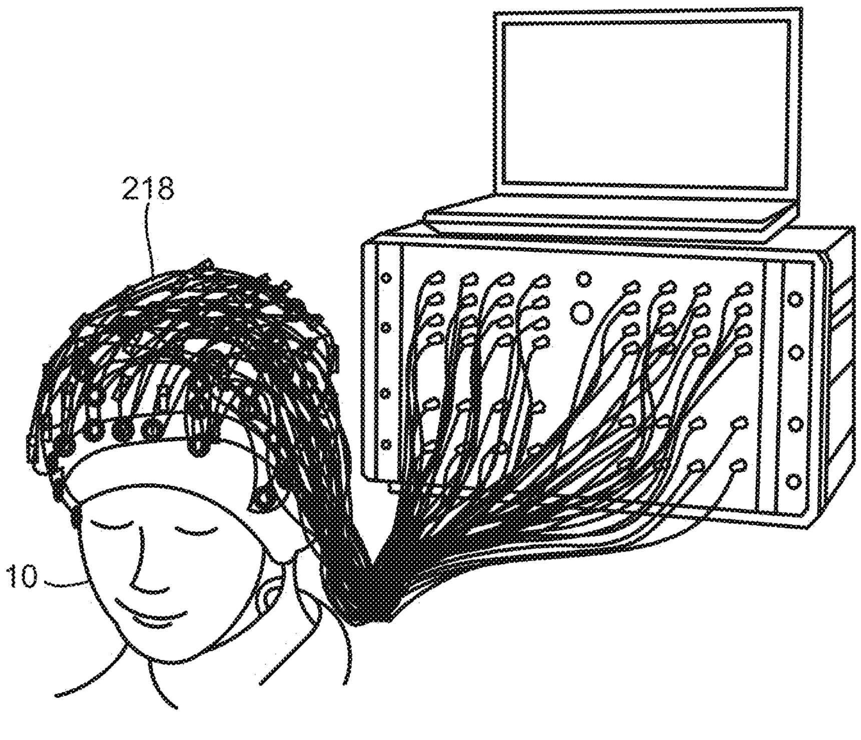
FIG. 2F illustrates one embodiment of a functional near-infrared spectroscopy (fNIRS) device serving as the recording device of the BCI system.

FIG. 2F illustrates that in another embodiment of the system 100, the recording device can be a functional near-infrared spectroscopy (fNIRS) device 218. The fNIRS device 218 can use near-infrared light (NIR) to measure hemodynamic activity in the brain of the individual as the individual engages in neural activity as part of the neurofeedback training. For example, the fNIRS device 218 can comprise a fNIRS cap configured to be worn on the head of the individual. The fNIRS device 218 can comprise a plurality of NIR light sources and detectors (called optodes). The fNIRS device 218 can measure the hemodynamic activity by measuring changes in oxy-hemoglobin concentrations (HbO) and deoxy-hemoglobin (HbR) concentrations in the cerebral cortex.

FIG. 3A illustrates an example where the device 100 records or detects neural activity such that the receiver and transmitter unit 102 or the signal control unit produces an electronic signal representing the neural activity and transmits the electronic signal(s) to one or more computing devices/computer processors. For example, the computer processor can comprise the signal control unit 120 or can comprise an external electronic computing device 130. These devices 120/130 can be programmed to convert brain activity into predictions concerning an intention 408 of the individual. As will be discussed in more detail in later sections, the intention can be a thought conjured by the individual or an attempt made by the individual to move a body part of the individual (e.g., move a left hand or left ankle of the individual). Moreover, the intention can also be a thought conjured by the individual or an attempt made by the individual to reach or maintain a neural rest state. In these cases, the intention is not directly related to the individual focusing their attention or viewing certain graphics rendered on a display of a device such as the computing device.

FIG. 3A illustrates one example of software layers or modules running on the computing device 120/130 of the BCI system. For example, one or more processors of the computing device 120/130 can be programmed to execute software instructions, making up the various software layers or modules. In other embodiments, not shown in the figures but contemplated by this disclosure, any references to a computing device or computer processor can also refer to a control unit or controller embedded within the receiver and transmitter unit 102. In further embodiments contemplated by this disclosure, any references to the computing device can also refer to a computing device or control unit/controller that is part of the recording device 100 (for example, when the recording device 100 is an fMRI machine or an fNIRS device).

The pre-processing layer 302 can comprise a plurality of software filters or filtering modules configured to filter and smooth out the raw signals obtained from the recording device 100. For example, when the recording device 100 is an endovascular recording device configured to be implanted within a brain vessel of the individual (e.g., the stent-electrode array 102), the brain activity of the individual can be monitored using the various electrodes 103 of the recording device 100. As a more specific example, the brain activity of the individual can be sampled every 100 ms such that 100 ms "chunks" or bins of the raw neural signals recorded can be passed to the pre-processing layer 302 for processing and smoothing.

The pre-processing layer 302 can first apply a (1) threshold filter to filter out the raw signals using certain thresholds. The pre-processing layer 302 can then apply a (2) notch filter to perform, for example, 50 Hz notch filtering, and also apply a (3) bandpass filter to perform, for example, 4-30 Hz Butterworth bandpass filtering. The pre-processing layer 302 can then apply a (4) wavelet artifact removal filter to perform wavelet-based artifact rejection, a (5) multi-taper spectral decomposition filter to perform multi-taper spectral decomposition, and a (6) boxcar smoothing filter to perform temporal boxcar smoothing. The filtered data can then be fed to the classification layer 304 of the decoder module 300.

As shown in FIG. 3A, the computing device can comprise at least one decoder module 300 and a neurofeedback module 308. The decoder module 300 can further comprise one or more pre-processing layers 302 and a classification layer 304. As discussed below, the decoder module can select different decoder settings based upon the individual BCI user's environmental or application factors.

In another variation, the systems and methods described herein allow a BCI system to automatically or selectively use different decoder settings based on one or more factors. Such factors can include, but are not limited to, environmental factors or application factors.

Some decoders are more suitable in some circumstances than others. BCI decoders are typically used to change the state of a computer application. Some state transitions have higher potential functional and social consequences than others (e.g., pressing send on an email compared to typing a character). It may be appropriate to change decoders based on their comparative accuracy/speed and the current context of the application state. However, changing decoders can be unwieldy and can undermines autonomy for an individual to have to switch decoders manually.

The application software, via a commercially available platform, including a mobile device platform, can detect a variety of information including what type of application is being used, and about where and how the patient is using the system. This "context" may include the activity in which the user is engaging such as typing, using social media, engaging with a "tiled" graphic user interface, browsing through an internet browser, interacting with a mixed-reality headset; navigating a map, watching a video, engaging in a computer. game. The context can also include environmental factors like temperature, lighting, ambient noise etc.; external physiological data like heart rate available as part of the Apple health ecosystem or other similar systems.

Given the context, the system can adjust its decoding settings based on this information or a variety of information. Such an adjustment can include changing the algorithm, changing the underlying neural phenomena being used by the decoder, or both.

Different algorithms have different characteristics. For example, asynchronous switch algorithms make predictions on a quasi-continuous basis (e.g., one prediction every 100 ms). This contrasts with synchronous switch algorithms, which make predictions on timescales that users can aptly respond to (e.g., 2-4 seconds). Therefore, asynchronous algorithms tend to have a higher likelihood of producing false positives than synchronous algorithms. A contextually aware system may wish to change to a more accurate yet slower synchronous decoder when potentially eliciting high consequence application state changes (e.g., sending an email).

FIG. 3B illustrates a basic example of using context to determine which decoder 80, 82 is used to decode a signal in a BCI. In this example, the individual is monitored to obtain contextual data regarding the individual's behavior, condition, or situation. This contextual data can include any information that will be relevant to the individual. For example, such data include information on which electronic devices are presently connected to the BCI system (e.g., see FIG. 1I), which device is currently being used by the individual, what is the screen/GUI featuring: whether a keyboard or the tile format or something else, data on whether the system locked or in use, data on whether one or more components of the BCI system and electronic devices are powered down or powered up, receiver and transmitter battery status, accelerometer data to determine if the individual is moving or stationary, what end device is being used by the host device (connectivity information), physiological data of the user (e.g., heart rate, fatigue, caffeination, temperature, blood pressure, etc.)

The context data acts as an input to determine which decoding algorithm or process (e.g., 80 or 82) is used to produce an output for the individual to use to engage the BCI system and/or associated electronic devices. While the illustration in FIG. 3B shows two decoding choices 80 82, the system can include any number of decoding algorithms or processes.

In practice, the a neural interface device 100 is configured to detect a brain activity of an individual. A component, such as the receiver and transmitter unit or the signal control un, generates and transmits an electronic signal to a computer processor (e.g., See FIGS. 1E and 1I) the signal control unit 120, an external computer 130, etc.) The system, typically the computer processor, also monitors the individual to generate contextual data. Alternatively, or in combination, the contextual data can be generated by the electronic device(s) that the individual is using, physiological data associated with the individual, and/or specific actions taken by the individual while engaging the electronic devices. The electronic signal is then processed using the computer processor to produce an output signal, where the computer processor is configured to selectively apply at least one algorithm from a plurality of algorithms for decoding the electronic signal, wherein selection of the at least one algorithm is at least partially dependent on the contextual data. This output signal is then electronically transmitted to one or more external electronic devices such that the individual is able to interact with the one or more external electronic devices using the brain activity (e.g., see FIG. 1I transmission 22, 24, 26, etc.)

Generating the contextual data can occur by actively monitoring the individual prior to or during interaction between the individual and the one or more external electronic devices. As shown in FIG. 1I, the electronic devices can provide contextual data, which includes information associated with electronic devices (e.g., the type of device, the type of control required, etc.).

Additionally, different neural phenomena also have different characteristics. This may be in terms of signal-to-noise ratio, timescale of manifestation, and context of action. For example, oscillatory bursts are volitionally produced and fast-acting so are suitable for applications such as typing. Error-related potentials (ErrPs), on the other hand, are not volitionally produced but can indicate when an erroneous action has been taken [1]. Switching the decoder to look for ErrPs after application state changes may be a beneficial undertaking.

In some embodiments, a neurofeedback graphical user interface (GUI) 400, as shown in FIGS. 4A-4E can be displayed on a display 212 communicatively coupled to the computing device or processor. The individual can view the neurofeedback GUI 400 on the display 212 while the individual is undergoing neurofeedback training. As will be discussed in more detail in later sections, a moveable graphic element 406 (see e.g., FIGS. 4A-4E and 5A-5C) can be shown on the neurofeedback GUI 400 representing a current brain activity of the individual recorded by the recording device 100. The neurofeedback GUI 400 and the graphic element 406 can be constructed in a way that reduces the complexity of the brain activity recorded by the recording device 100 into a form that is engaging and easy to comprehend by the individual. Moreover, the neurofeedback GUI 400 and the graphic element 406 can aid the individual in producing brain activity that aligns with a desired intention of the individual.

The computing device can convert brain activity recorded by the recording device 100 into predictions concerning the intention 408 of the individual by being trained to map or associate previously recorded brain activity to certain intentions 408. For example, the computing device can be trained using training set data gathered from the individual as the individual repeatedly initiates, sustains, and terminates certain intentions 408. During these training sessions, the brain activity of the individual can be recorded by the recording device 100.

Once the computing device is trained or calibrated using training set data gathered from the individual, the computing device can control certain peripheral devices or software applications running on such peripheral devices based on the predicted intentions 408 of the individual. For example, the computing device can be communicatively coupled to (i.e., in wired or wireless communication with) a peripheral device such as a personal electronic device, an IoT device, a mobility vehicle or a software application running on the peripheral device. The computing device can transmit signals or commands to the peripheral device or the software application to control the operation or functionality of the peripheral device or the software application in response to the predicted intentions 408 of the individual. For example, the computing device can instruct a mobility vehicle (e.g., a wheelchair) transporting the individual to move in a forward direction in response to the individual formulating or carrying out an intention 408 to move the individual's left hand.

However, as previously discussed, whether the individual is able to use the BCI system to successfully control the peripheral device or software application depends on the ability of the individual to self-regulate their brain activity and to consistently produce brain activity calibrated to the intention 408. Therefore, neurofeedback training can improve the individual's control over the BCI system 100 and, ultimately, improve the individual's control over one or more peripheral devices communicatively coupled to the BCI system 100 or software application running on such peripheral devices.

The classification layer 304 can comprise one or more machine learning algorithms or classifiers 306 to classify the resulting data segments or bins into an intention 408 (see FIGS. 4A-4E and 6-8) of the individual. In some embodiments, the machine learning algorithm or classifier 306 can be a supervised learning model such as a support vector machine (SVM). In other embodiments, the machine learning algorithm or classifier can be a Gaussian mixture model classifier, a Naïve Bayes classifier, or another type of machine learning classifier.

The classification layer 304 can be trained or calibrated to classify or make predictions concerning the intention 408 of the individual based on previously recorded brain activity. For example, the classification layer 304 can predict the individual's intentions 408 several times per second. The classification layer 304 can be trained using training data collected from the individual.

In some embodiments, the training phase can involve the individual repeatedly initiating, sustaining, and terminating certain thoughts or attempting certain actions while the individual's brain activity is recorded by the device 100. For example, one such training session can involve the individual repeatedly resting for 5 seconds followed by attempting to move their left hand for 5 seconds. The individual's brain activity during this training session can be recorded, and the recorded brain activity can be mapped to the individual's intentions 408 to rest and move their left hand, respectively.

As shown in FIG. 3, the classification layer 304 can feed the predicted intention 408 of the individual to the neurofeedback module 308. In some embodiments, the neurofeedback module 308 can be configured to construct certain neurofeedback GUIs (see, e.g., FIGS. 4A-4E and 6) to be displayed to the individual via a display 212 communicatively coupled to the computing device to aid the individual in producing or recreating brain activity that aligns with a desired intention of the individual. In other embodiments, the neurofeedback module 308 can also transmit commands or signals to a user output device (e.g., a speaker or a tactile feedback component) communicatively coupled to the computing device to generate a user output (e.g., sounds or tactile feedback) to aid the individual in producing brain activity that aligns with a desired intention of the individual. The neurofeedback module 308 will be discussed in more detail in the following sections.

As for other details of the present invention, materials and manufacturing techniques may be employed as within the level of those with skill in the relevant art. The same may hold true with respect to method-based aspects of the invention in terms of additional acts that are commonly or logically employed. In addition, though the invention has been described in reference to several examples, optionally incorporating various features, the invention is not to be limited to that which is described or indicated as contemplated with respect to each variation of the invention.

Various changes may be made to the invention described and equivalents (whether recited herein or not included for the sake of some brevity) may be substituted without departing from the true spirit and scope of the invention. Also, any optional feature of the inventive variations may be set forth and claimed independently or in combination with any one or more of the features described herein. Accordingly, the invention contemplates combinations of various aspects of the embodiments or combinations of the embodiments themselves, where possible. Reference to a singular item, includes the possibility that there are plural of the same items present. More specifically, as used herein and in the appended claims, the singular forms "a," "and," "said," and "the" include plural references unless the context clearly dictates otherwise.

It is important to note that where possible, aspects of the various described embodiments, or the embodiments themselves can be combined. Where such combinations are intended to be within the scope of this disclosure.

What is claimed is:

1. A method of decoding an electronic signal that is generated by a neural interface device configured to detect a brain activity of an individual using a brain computer interface, the method comprising:

transmitting the electronic signal to a computer processor;

receiving a contextual data comprising data on a state of one or more interactive electronic devices that are operatively connected to the brain computer interface;

processing the electronic signal using the computer processor to produce an output signal, where the computer processor is configured to selectively apply at least one algorithm from a plurality of algorithms for decoding the electronic signal, wherein selection of the at least one algorithm is at least partially dependent on the contextual data; and electronically transmitting the output signal to the one or more interactive electronic devices such that the individual is able to interact with the one or more interactive electronic devices using the brain activity.

2. The method of claim 1, wherein receiving the contextual data by monitoring the individual occurs prior to or during interaction between the individual and the one or more interactive electronic devices.

3. The method of claim 1, wherein, prior to processing the electronic signal, the computer processor confirms that the electronic signal is representative of the brain activity that is intentionally generated by the individual.

4. The method of claim 1, wherein the contextual data includes information regarding the state of an interactive electronic device of the one or more interactive electronic devices that the individual is actively engaging.

5. The method of claim 1, wherein receiving the contextual data further comprises obtaining data regarding environmental factors associated with the individual.

6. The method of claim 1, wherein receiving the contextual data further comprises obtaining data regarding health information associated with the individual.

7. The method of claim 1, wherein receiving the contextual data comprises obtaining data regarding how the individual is using the plurality of interactive electronic devices.

8. The method of claim 1, wherein receiving the contextual data comprises obtaining data regarding whether the individual is attempting to move a cursor on one of the plurality of interactive electronic devices.

9. The method of claim 1, wherein receiving the contextual data comprises obtaining data regarding whether the individual is attempting to electronically enter text in of the plurality of interactive electronic devices.

10. The method of claim 1, wherein the contextual data selects the at least one algorithm to reduce latency of the output signal.

11. The method of claim 1, wherein the contextual data selects the at least one algorithm to increase latency of the output signal.

12. The method of claim 1, wherein the contextual data selects the at least one algorithm to increase an accuracy of the output signal.

13. The method of claim 1, wherein the contextual data selects the at least one algorithm to increase a speed of producing the output signal.

14. The method of claim 1, wherein the contextual data selects the at least one algorithm to produce the output signal as a continuous output signal.

15. The method of claim 1, wherein the contextual data selects the at least one algorithm to produce the output signal as a discrete output signal.

16. The method of claim 1, wherein the computer processor is located within a signal control unit comprising a housing structure that is physically separate from the neural interface device and is configured to be portable, and where electronically transmitting the output signal to one or more external electronic devices comprises electronically transmitting the output signal from the signal control unit.

17. The method of claim 16, wherein receiving the contextual data comprises obtaining data regarding which of the one or more interactive electronic devices are operatively connected to the brain computer interface.

18. The method of claim 16, wherein receiving the contextual data comprises obtaining data regarding a number of electronic communication modalities operatively connected to the brain computer interface.

19. The method of claim 16, wherein receiving the contextual data comprises obtaining data regarding an activity state of the signal control unit.

20. The method of claim 1, where receiving the contextual data includes monitoring a previous output signal transmitted to the one or more interactive electronic devices by the individual.

21. The method of claim 1, wherein the contextual data comprises non-neural data.

22. The method of claim 1, wherein the state one or more interactive electronic devices includes the state of a computer application of the one or more interactive electronic devices.

23. The method of claim 1, wherein the state of one or more interactive electronic devices includes a change in the state of a computer application of the one or more interactive electronic devices to a high consequence application state.

24. The method of claim 1, wherein the state of one or more interactive electronic devices includes a format of a screen or a graphic user interface of the one or more interactive electronic devices.

25. The method of claim 1, wherein selectively applying at least one algorithm from the plurality of algorithms for decoding the electronic signal comprises selecting between at least two distinct decoding processes.

26. A method facilitating interaction between an individual using a brain computer interface and one or more electronic devices using contextual information associated with the individual, when the individual uses a neural interface device that is configured to generate an electronic signal that is decoded from a brain activity of the individual, the method comprising:

transmitting the electronic signal to a computer processor;

receiving a contextual input data comprising data on a state of the one or more interactive electronic devices that are operatively connected to the brain computer interface, where the contextual input data informs the brain computer interface as to which of the one or more interactive electronic devices are connected and active with the brain computer interface;

processing the electronic signal using the computer processor to selectively apply at least one algorithm from a plurality of algorithms for decoding the electronic signal to produce an output signal, wherein selection of the at least one algorithm is at least partially dependent on the contextual input data; and electronically transmitting the output signal to the one or more electronic devices such that the individual is able to interact with the one or more electronic devices using brain activity.

* * * * *